June 15, 1965   H. A. MEAD   3,188,780
METHOD OF AND APPARATUS FOR FORMING ITEMS OF
DEFORMABLE MATERIAL
Filed Dec. 19, 1961   15 Sheets-Sheet 1

INVENTOR.
HARRY A. MEAD
BY
Horace B. Van Valkenburgh
ATTORNEY

June 15, 1965            H. A. MEAD            3,188,780
METHOD OF AND APPARATUS FOR FORMING ITEMS OF
DEFORMABLE MATERIAL
Filed Dec. 19, 1961            15 Sheets-Sheet 2

INVENTOR.
HARRY A. MEAD
BY
ATTORNEY

June 15, 1965 H. A. MEAD 3,188,780
METHOD OF AND APPARATUS FOR FORMING ITEMS OF
DEFORMABLE MATERIAL
Filed Dec. 19, 1961 15 Sheets-Sheet 3

INVENTOR.
HARRY A. MEAD
BY
*Horace B. Van Valkenburgh*
ATTORNEY

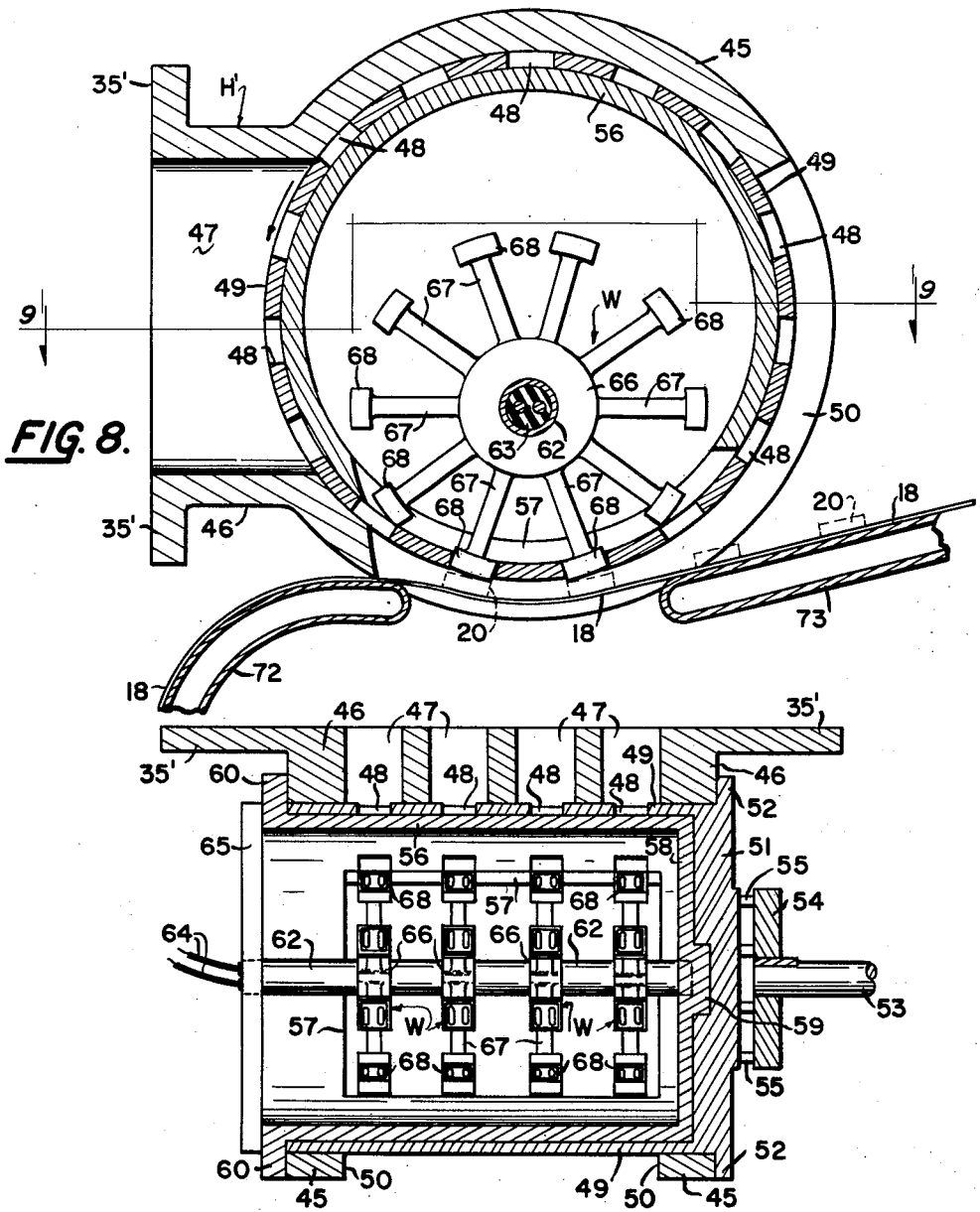

June 15, 1965  H. A. MEAD  3,188,780
METHOD OF AND APPARATUS FOR FORMING ITEMS OF
DEFORMABLE MATERIAL
Filed Dec. 19, 1961  15 Sheets-Sheet 5

INVENTOR.
HARRY A. MEAD
BY
ATTORNEY

INVENTOR.
HARRY A. MEAD
BY
Horace B. Van Valkenburgh
ATTORNEY

June 15, 1965  H. A. MEAD  3,188,780
METHOD OF AND APPARATUS FOR FORMING ITEMS OF
DEFORMABLE MATERIAL
Filed Dec. 19, 1961  15 Sheets-Sheet 7

INVENTOR.
HARRY A. MEAD
BY
Horace B. Van Valkenburgh
ATTORNEY

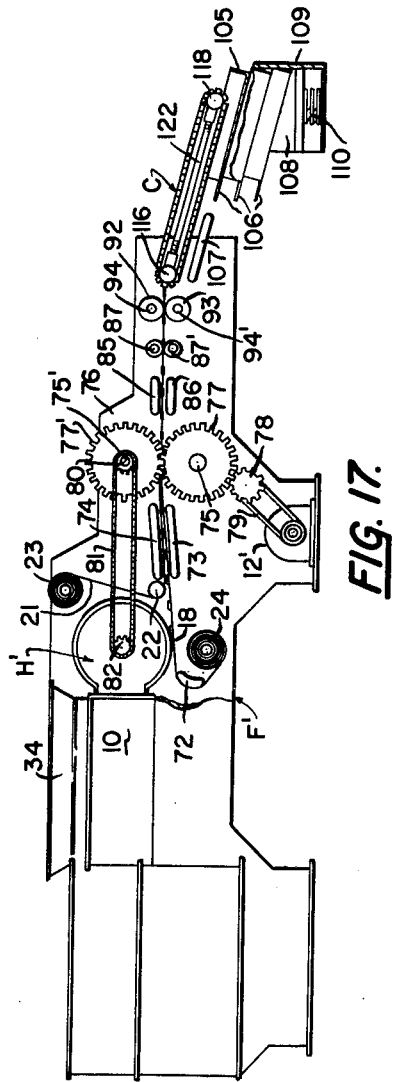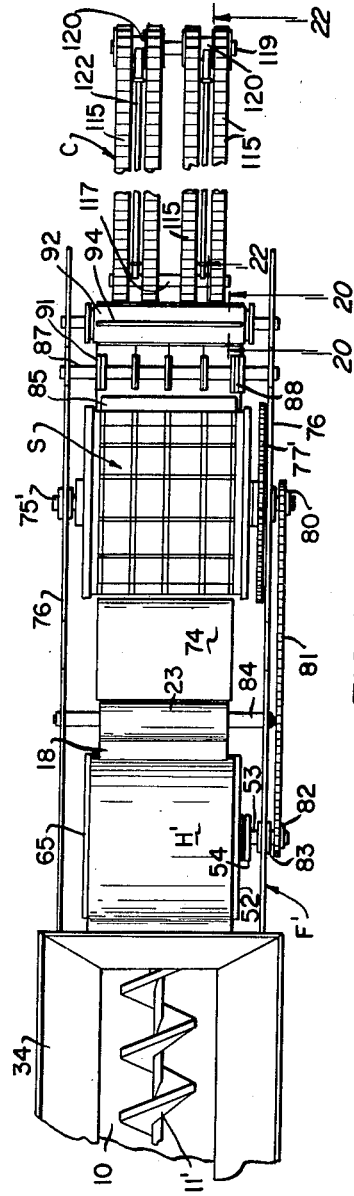

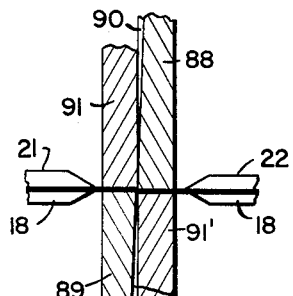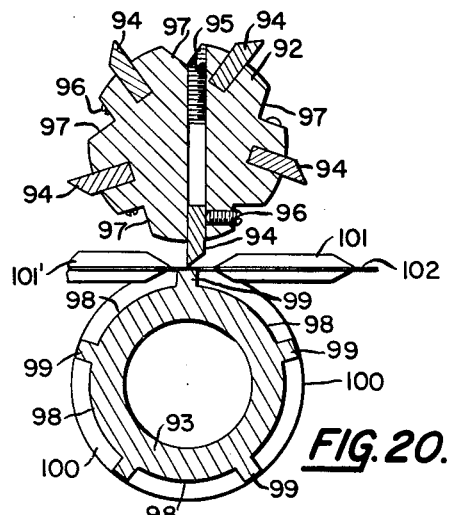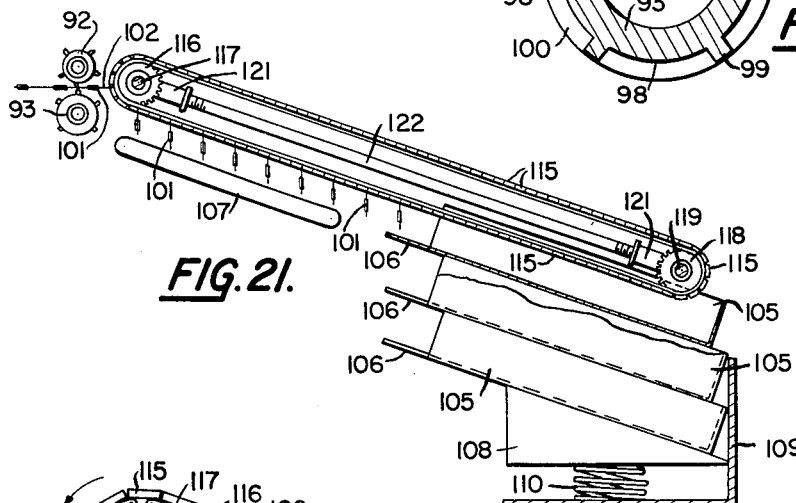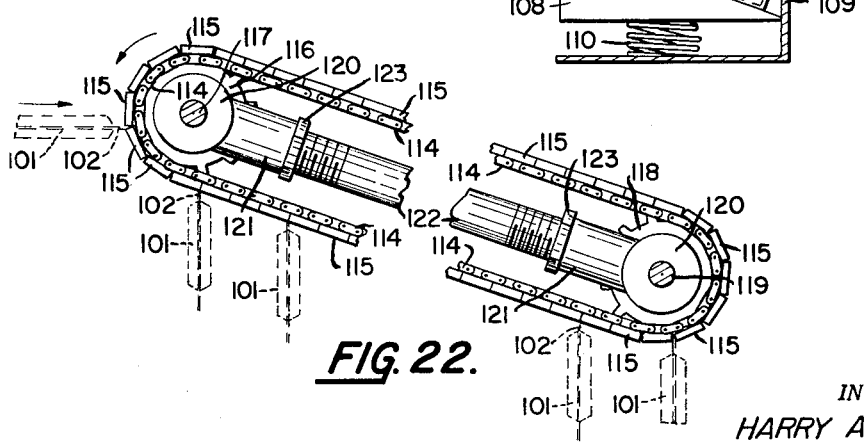

June 15, 1965  H. A. MEAD  3,188,780
METHOD OF AND APPARATUS FOR FORMING ITEMS OF
DEFORMABLE MATERIAL
Filed Dec. 19, 1961  15 Sheets-Sheet 10

INVENTOR.
HARRY A. MEAD
BY
Horace B. Van Valkenburgh

ATTORNEY

INVENTOR.
HARRY A. MEAD
BY
Horace B Van Valkenburgh
ATTORNEY

June 15, 1965 H. A. MEAD 3,188,780
METHOD OF AND APPARATUS FOR FORMING ITEMS OF
DEFORMABLE MATERIAL
Filed Dec. 19, 1961 15 Sheets-Sheet 12

INVENTOR.
HARRY A. MEAD
BY
Horace B. VanValkenburgh
ATTORNEY

INVENTOR.
HARRY A. MEAD
BY Horace B. Van Valkenburgh
ATTORNEY

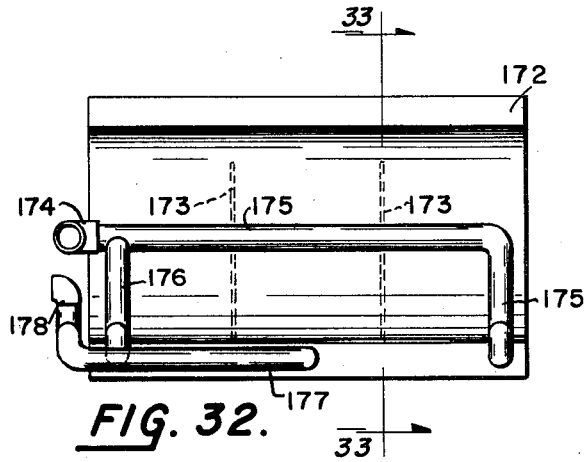
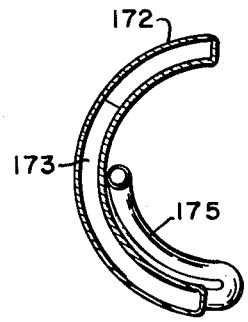
FIG. 32.   FIG. 33.
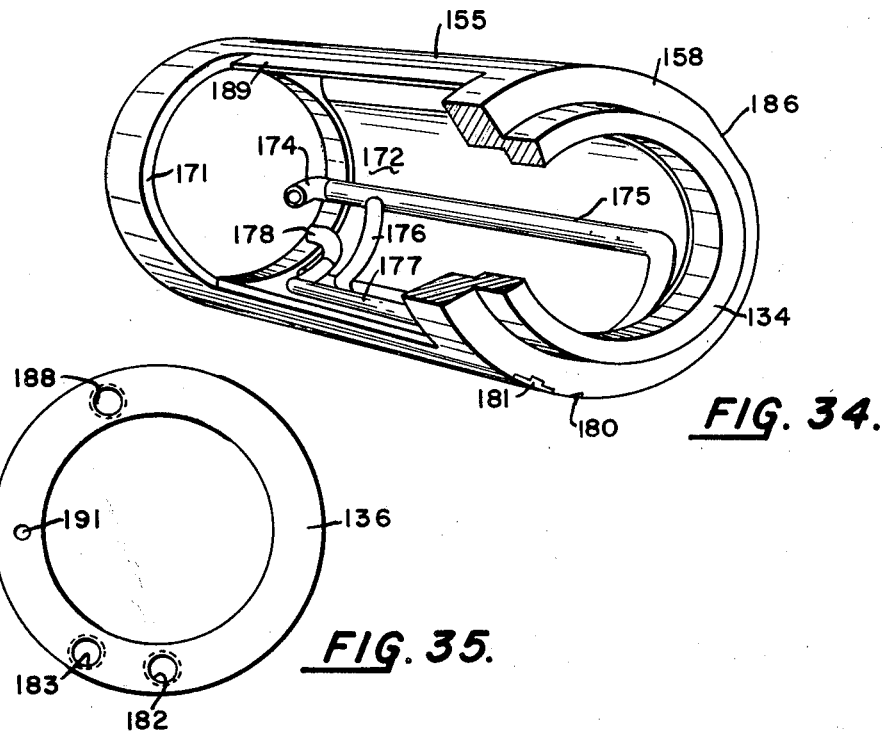
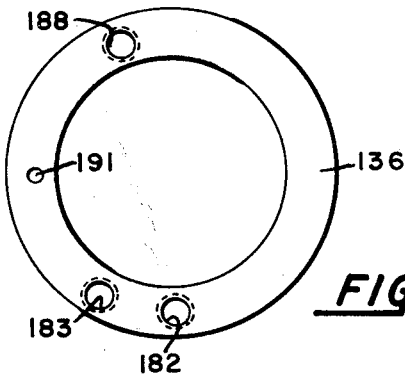
FIG. 34.
FIG. 35.
INVENTOR.
HARRY A. MEAD
BY
ATTORNEY

INVENTOR.
HARRY A. MEAD
BY
ATTORNEY

United States Patent Office 3,188,780
Patented June 15, 1965

3,188,780
METHOD OF AND APPARATUS FOR FORMING ITEMS OF DEFORMABLE MATERIAL
Harry A. Mead, Lakewood, Colo., assignor to Butter-Pak, Inc., Denver, Colo., a corporation of Colorado
Filed Dec. 19, 1961, Ser. No. 162,307
29 Claims. (Cl. 53—25)

The present application is a continuation-in-part of my application Seral No. 625,694, filed December 3, 1956, and now abandoned.

This invention relates to a method of and apparatus for forming individual items, such as cubes, pats or the like, of a deformable and normally solid material, such as butter, and to a method of and apparatus for forming and packaging individual items from a deformable but generally solid material, such as butter. The latter method and apparatus thus are related to the invention of my U.S. Patent 2,958,173, granted November, 1960, entitled "Apparatus For Producing Food Packages."

It is often desirable to form individual cubes, pats or the like of a material which is normally solid, but which may be rendered deformable by pressure, heat or the like. This is particularly true in the case of butter which, however, should not be maintained in a heated condition for more than a short period of time to avoid loss of shape or appearance, as well as possible spoilage. Also, it is desirable in the case of a food product, such as butter, to eliminate manual handling of exposed items, such as small cubes or pats of butter and as in restaurants, hotels and the like. Such manual handling is unsanitary and the loss of butter, due to manual handling of exposed items, is considerable in view of the fact that unprotected butter which is placed on a consumer's table, for instance, but not used, must be discarded in view of the possibility of contamination. Butter may be distributed in the form of larger cubes, which may be cut into smaller cubes or pats, but this is a time-consuming operation. Also, bulk butter can be extruded through a die or dies into elongated cube form and such cubes severed at appropirate positions to form smaller cubes or pats, but the handling of the individual pats becomes unduly complicated, since the placement of such pats on small individual receptacles, and particularly the handling of such pats after placement on the receptacles, involves undue difficulties, since the butter must be kept sufficiently cool that the pats will not lose their shape and there are always exposed surfaces which tend to adhere to other receptacles. Thus, numerous problems are involved in handling and distribution, as well as forming the cubes or pats initially and transferring them to individual receptacles.

My U.S. Patent 2,958,173 discloses apparatus for producing closed packages containing food items, including food items placed in spaced relation between upper and lower strips formed of heat sealable material, which may comprise a pair of generally cylindrical heating assemblies rotation about parallel axes with the peripheries in substantially abutting relationship, for sealing the strips together around the food items, as well as cutting or severing means for cutting the packages apart after sealing, which eliminates the unsanitary aspects of manual handling, since each of the food items, such as butter pats, is is individually sealed in a container which is readily opened by the ultimate user. Reference is made to this patent for more specific details of the package and of appropriate means for heat sealing the strips, but it will be understood that the method and apparatus of this invention may be used in conjunction therewith.

Among the objects of the present invention are to provide a novel apparatus for forming individual items, such as cubes or pats, from a deformable material such as butter; to provide such apparatus which will deliver the individual items in spaced relation, such as onto a sheet adapted to receive the same, such sheet conveniently being formed of heat sealable material; to provide a novel method of forming individual items, such as cubes or pats, of a deformable material and transferring the same to a sheet, such as of heat sealable material, as well as to provide novel apparatus particularly adapted to carry out such a method; to provide a novel method of and apparatus for forming and packaging individual items of a deformable material, such as butter, such method and apparatus being adapted to include the above method and apparatus of this invention, but not necessarily being limited thereto; to provide a novel discharge conveyor for a series of items such as packages and which is particularly adapted to be utilized as part of such apparatus; to provide each such apparatus of this invention which may be used as production equipment; to provide each such method of this invention which may be readily carried out; and to provide each such method and apparatus of this invention which will be highly effective in operation.

The foregoing and additional objects of this invention, as well as the novel features thereof, will become apparent from the description which follows, taken in connection with the accompanying drawings, in which:

FIG. 8 is a fragmentary vertical section, similar to FIG. 3, but illustrating a second embodiment of this invention;

FIG. 9 is a horizontal section taken along line 9—9 of FIG. 8;

FIG. 17 is a partially diagrammatic side elevation, similar to FIG. 2, illustrating apparatus for forming and packaging individual items of deformable material, such as butter, and particularly adapted to carrying out one of the novel methods of this invention;

FIG. 18 is a fragmentary top plan view of the apparatus of FIG. 17, on a slightly larger scale;

FIG. 19 is an enlarged, fragmentary vertical section showing the operating portion of one pair of longitudinal slitting and drawing discs, a series of which are utilized in the apparatus of FIG. 17;

FIG. 20 is an enlarged vertical section, taken along line 20—20 of FIG. 18 through a transverse slitting roll and a backing roll therefor;

FIG. 21 is a side elevation of a discharge conveyor of the apparatus of FIG. 17 and certain associated parts, on a larger scale than FIG. 17;

FIG. 22 is a longitudinal section, on a further enlarged scale, taken along line 22—22 of FIG. 18;

FIG. 32 is a rear elevation, on an enlarged scale, of a water jacket of the head of FIGS. 24 and 25;

FIG. 33 is a vertical section, taken along line 33—33 of FIG. 32;

FIG. 34 is an enlarged perspective view of the water jacket of FIG. 33 and a stationary cylinder in which it is mounted, the cylinder being partly broken away to show the construction more clearly;

FIG. 35 is a side elevation of a bearing mounted on one end of the stationary cylinder of FIG. 34;

Figure 1:
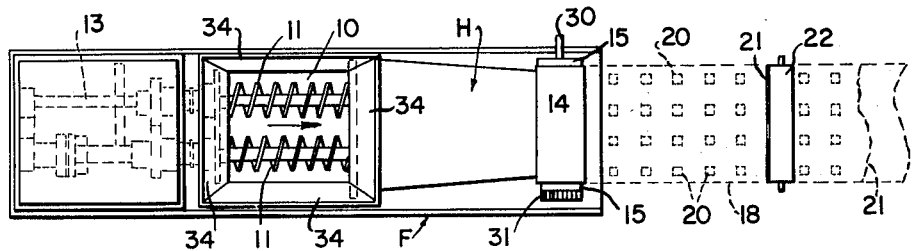
FIG. 1 is a top plan view of one form of apparatus, constructed in accordance with this invention, for producing individual items, such as cubes or pats, of a deformable material.

The method of this invention for forming individual items, such as cubes, pats and the like, of a deformable material, such as butter, may comprise pushing such deformable material into a space having a size comparable to that of the item desired, confining the material in such space and removing the material from such space by contacting the item with a strip of material as the item emerges from the confined space, preferably so that the item will adhere to the strip. Heat may be applied to the item while in the confined space, so that it may more readily be removed therefrom, while the strip which contacts the items and assists in its removal may be chilled so as to enhance the adherence of the item to the strip. The strip may, of course, be heat sealable material and the additional method of this invention, of forming such items and also packaging the same, may include the above steps and the further steps of moving such a strip past a series of such spaces in turn so that the items will adhere to and be removed by the strip and disposed in spaced relation thereon. Then, a second strip, also conveniently of heat sealable material, may be placed above the items on the first strip, thus providing upper and lower strips between which the items are disposed. The upper and lower strips may then be chilled, as in FIG. 8, to limit heating of the items in the next step, that of heat sealing the upper and lower strips together around each item. Of course, with the apparatus of FIGS. 23-38, the upper strip is placed over the lower strip almost immediately after the butter pats are placed on the lower strip, eliminating the necessity of chilling the strips. Then, the sealed strips may be cut or severed to produce individual packages containing such items, after which the packages may again be chilled and conveyed to automatic or substantially automatic packaging machinery, such as a novel discharge conveyor. The heat sealing devices may be constructed as disclosed in my U.S. Patent 2,958,173, although this method is not necessarily limited thereto nor to the specific apparatus hereinafter described.

Apparatus which is particularly adapted to carry out the method first described above and a portion of the second method described above may, as illustrated in FIGS. 1–3 comprise a machine having parts mounted on or supported by a frame F and including a hopper 10 in which may be installed a pair of augers or screws 11 adapted to move the deformable material, such as butter or the like, toward the discharge end of the hopper 10, i.e., in the direction of the arrow between the two screws 11. The screws 11 may be rotated in a suitable manner, as by a motor 12 and drive arrangement 13 of a conventional nature, while the material pushed toward the discharge end of the hopper by the screws 11 may enter a forming head which includes a housing H provided at its opposite end with a transverse cylinder 14, the otherwise open ends of which are closed by end caps 15. Cylinder 14 may be provided with a discharge slot 16, one end 17 of which may be arcuate so as to conform to the path of movement of a strip 18 at a feed roll 19, the width of slot 16 and strip 18 preferably being similar so that slot 16 will form a lateral guide for the strip. The strip 18 is adapted to receive and carry away the cubes or pats 20, as of butter, i.e., the individual items formed of the deformable material, while, as in FIG. 2, an upper strip 21 may be placed over the items 20, as after passage around a feed roll 22, the feed rolls 19 and 22 preferably being driven in synchronization and the upper strip 21 being fed from a supply roll 23 and the lower strip 18 from a supply roll 24.

Figure 3:
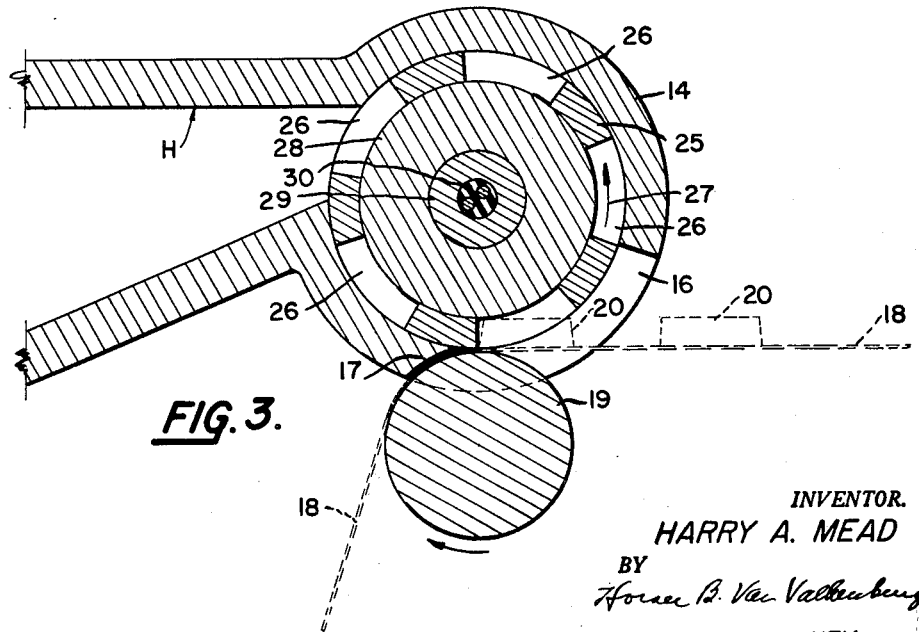
FIG. 3 is a fragmentary vertical section, on an enlarged scale, of a forming head forming a part of the apparatus of FIG. 1.
Figure 4:
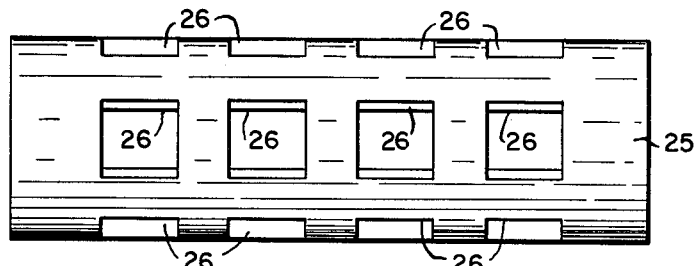
FIG. 4 is a side elevation, on a slightly smaller scale than that of FIG. 3, of a slotted sleeve forming a part of the apparatus of FIG. 1.

Installed within the end cylinder 14 of the housing H is a rotating sleeve 25 having a series of slots 26 therein, as in FIG. 4, it being noted that there may be four rows of circumferential slots 26 with five slots in each row, or any other desired number. Sleeve 25 is rotated in the direction of arrow 27 of FIG. 3, as by being attached to or having a sufficiently tight fit on a shaft tube 28 that the sleeve 25 will rotate with the shaft tube 28. A heater tube 29 may be disposed centrally of shaft tube 28 and may be provided with a central bore for receiving a heater 30, which may be formed of two or more wires embedded in insulation, as shown, or in any other suitable manner.

Figure 2:
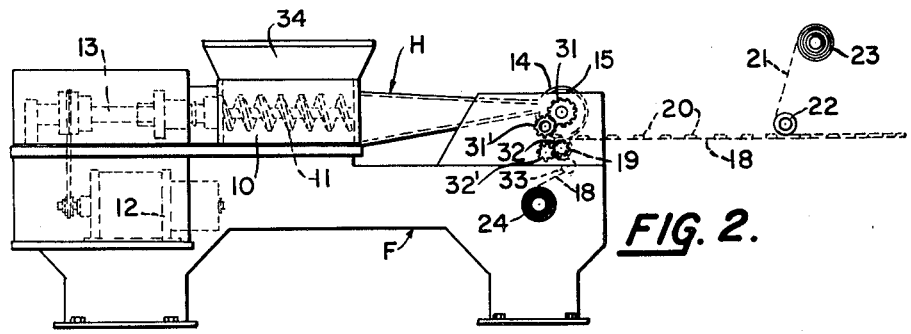
FIG. 2 is a side elevation of the apparatus of FIG. 1.

As in FIG. 2, the shaft tube 28 may be driven by gears 31 and 31', while the feed roll 19 for the lower strip 18 may be driven by gears 32 and 32' and a takeup roll 33 may be interposed between the supply roll 24 and feed roll 19 for lower strip 18. Suitable drive means, being conventional and therefore not shown, may be provided for driving gears 31, 31' and 32, 32', as from the motor 12 or a separate motor, while suitable supports for the supply roll 24, feed roll 19 and takeup roll 23 may be provided within framework F, and suitable supports for supply roll 23 and feed roll 22 for the upper strip 21, as well as a suitable drive connection for the feed roll 22, may also be provided. Also, upper edges 34 of hopper 10 may flare outwardly, as shown, to facilitate filling of the hopper.

It is to be noted that feed roll 19 is preferably driven at a sufficient rate in the direction of the arrow of FIG. 3 that the speed of travel of lower strip 18 is slightly greater than the peripheral speed of slotted sleeve 25, to insure that the items 20, such as butter pats, will be more readily pulled from slots 26. A difference between the rate of travel of strip 18 and the peripheral speed of slotted cylinder 25 of 0.075 in. per revolution of cylinder 25 has been found satisfactory, when the outer diameter of cylinder 25 was 3.160 in., and similar differences in speed should be satisfactory for other cylinder diameters.

Figure 5:
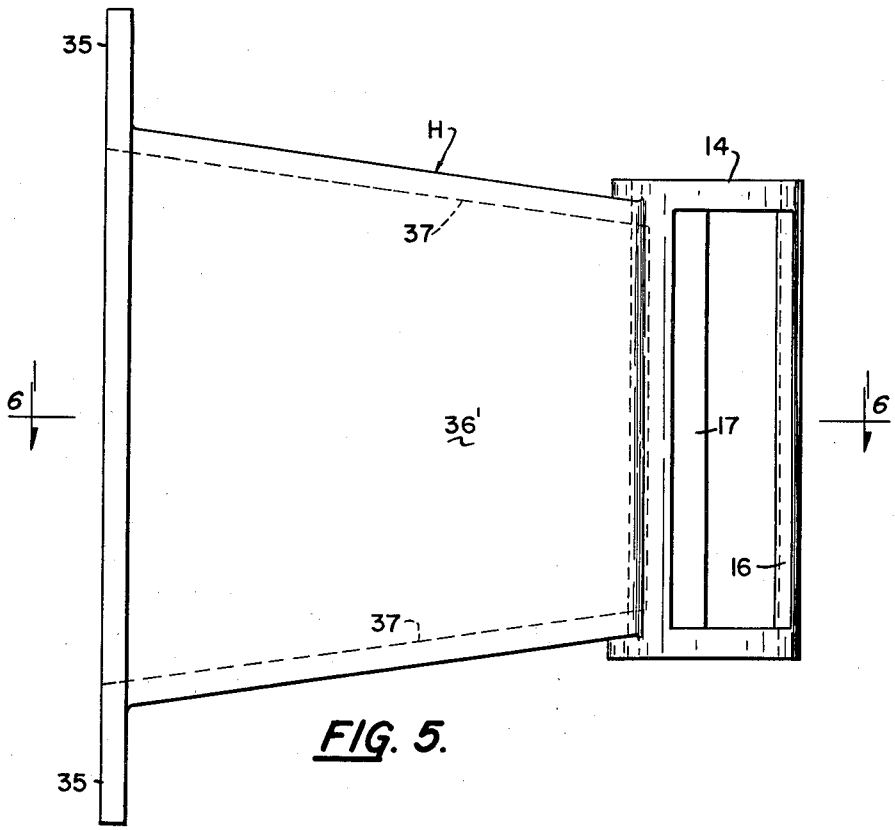
FIG. 5 is a bottom plan view, on a slightly smaller scale than that of FIG. 4, of a housing forming a part of the apparatus of FIG. 1.
Figure 6:
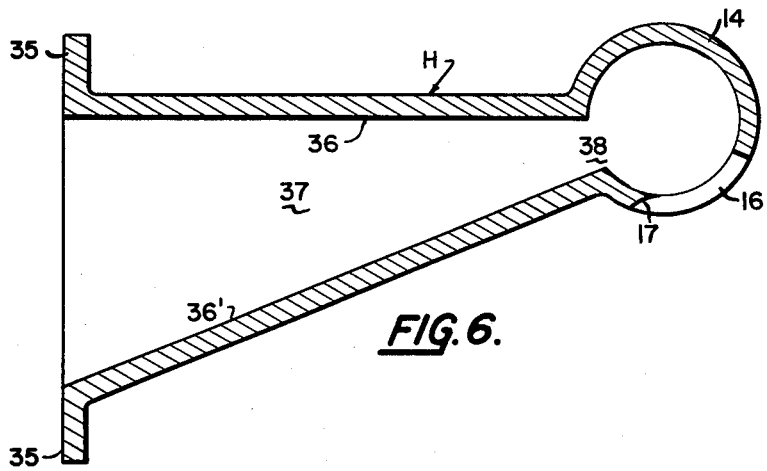
FIG. 6 is a vertical section, taken along line 6—6 of FIG. 5.
Figure 7:
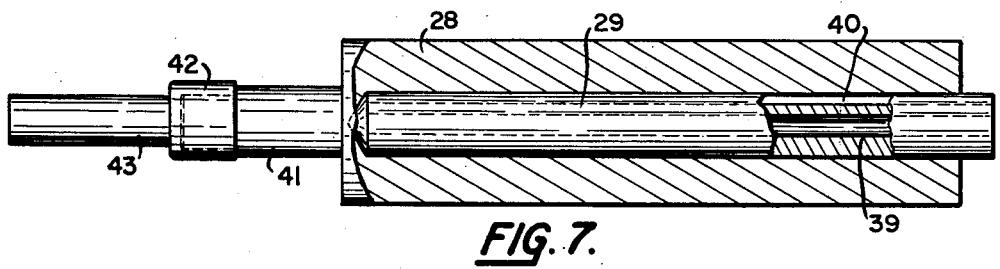
FIG. 7 is a side elevation, with portions broken away to show the interior construction, of a shaft and heating unit assembly forming a part of the apparatus of FIG. 1.

As shown in FIGS. 5 and 6, the housing H may be provided with rear flanges 35, for attachment thereof, as by bolts, to the discharge end of hopper 10, a top wall 36 and a bottom wall 36' converging toward the top wall, and converging side walls 37 and 37', the converging walls leading to a throat or opening 38 into cylinder 14, as in FIG. 6. As in FIG. 7, heater tube 29 may be provided with an axial bore 39, for heater 30 of FIG. 3, and a slot 40 adapted to receive a temperature responsive element, for indicating the temperature at that point or controlling the temperature through control of the heater in a conventional manner. The tube shaft 28 may be provided with an axially extending pin 41, the outer end of which may have an irregular contour to fit into and provide connection with a corresponding socket 42, provided on the end of a shaft 43 for the gear 31 of FIG. 2.

During operation of the apparatus illustrated in FIGS. 1–7, as will be more clearly evident primarily from FIG. 3, the butter or other deformable material pushed by screws 11 of FIG. 1 into housing H will enter successive slots 26 of slotted sleeve 25, as the latter rotates in the direction of arrow 27, the butter being moved through throat 38 of FIG. 6. As each slot 26 passes the edge of throat 38, the butter will be confined in the space defined by each slot 26, the outer edge of shaft 28 and the inner edge of cylinder 14. The surfaces of this confined space and particularly the edges of the slots 26 and the outer edge of shaft 28 will be heated by heat conducted from heater 30, and as soon as each slot 26 reaches the slot 16 in housing H, the pat 20 or corresponding item, if the material being treated is other than butter, will tend to fall out of the slot 26. In addition, each item or pat 20 will engage the strip 18 and will tend to adhere to the strip and thereby be pulled from the space defined by slot 26 by such adherence. Thus, the individual items or pats 20 will be disposed in spaced relation transversely of strip 18, corresponding to the transverse spacing of slots 26 in sleeve 25, and also will be disposed in longitudinally spaced relation on the strip, corresponding to the rate of deposit on strip 18, which is dependent upon the circumferential spacing of slots 26 and the preferably slightly greater rate of travel of strip 18. As will be evident, a continuous supply of deformable material, such as butter, may be supplied to housing H by screws 11, while individual items or pats 20 are successively carried away by strip 18. Thus, the apparatus may be operated continuously, or at least as long as the supply of strip 18 from a single roll 24 lasts, which may be a considerable time as the strips coiled in such rolls may be several hundred feet in length. In order to conduct heat more readily, the sleeve 25, shaft tube 28 and heater tube 29 may be formed of a material having a relatively high thermal conductivity, such as brass or bronze alloy, it being noted that such an alloy is corrosion resistant and therefore adds to the sanitary aspects of the apparatus. The slotted sleeve 25, shaft tube 28 and heater tube 29 may be cast, or cast and then machined, or machined from tubular or cylindrical stock, while housing H may be formed of any desired corrosion resistant material such as an aluminum alloy, and may be cast and then machined, such as to smooth and enlarge the interior of cylinder 14 to the desired diameter, cut the slot 16 and form a sufficiently flat surface on the rear side of flange 35. If desired, the remaining interior surfaces of housing H may be machined, but this is normally unnecessary. The heater tube 29 is preferably stationary to avoid complications in supplying electricity to heater 30, while the pin 42 of shaft tube 28, shown in FIG. 7, may be rotated in a suitable bearing, it being noted that shaft tube 28 will then rotate around heater tube 29, but with a suitable bearing support for the pin 41, no undue complications need ensue.

The production rate of the apparatus of FIGS. 1–7, particularly when provided with the individual parts shown in FIG. 3, may be found to be somewhat limited, so that when a higher production rate is desired, apparatus as illustrated in FIGS. 8–16 may be used. In such apparatus, the forming head shown in FIGS. 8 and 9 and including a housing H', may be substituted for the housing H and associated parts of FIGS. 1 and 2, it being noted that housing H' is provided with a rear flange 35' which is adapted to be bolted to the discharge end of hopper 10 in a manner similar to housing H. When high production rates are used, the butter or other deformable material will normally be pushed into the housing H' at a rate faster than that for housing H, so that housing H' can be shorter and provided with a cylinder 45 having a greater diameter than cylinder 14 of housing H. Cylinder 45 may be open at each end and also provided with a rearwardly extending section 46 which may be surrounded by flange 35' and integral therewith. As in FIGS. 9 and 11, section 46 may be provided with a series of inlet slots 47, such as four in number, corresponding to the lateral spacing of a series of slots 48 in a sleeve 49, which rotates within cylinder 45. A discharge slot 50, as in FIGS. 9 and 12, may extend from the lower portion of cylinder 45 to a point above center, as in FIG. 8, the width of slot 50 preferably being just slightly greater than the width of the strip 18, so that the strip 18 will be guided laterally as it passes along the lower edge of cylinder 45.

Figure 10:
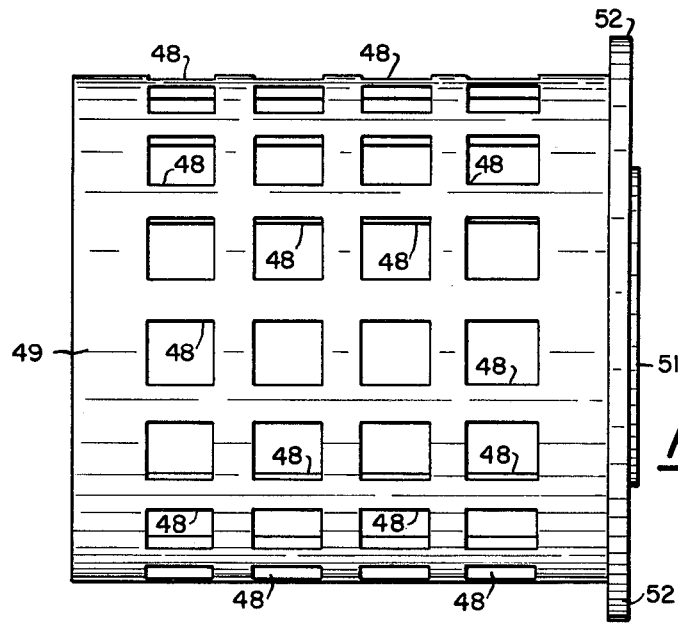
FIG. 10 is a side elevation on an enlarged scale, of a slotted cylinder utilized in the apparatus of FIG. 8.
Figure 11:
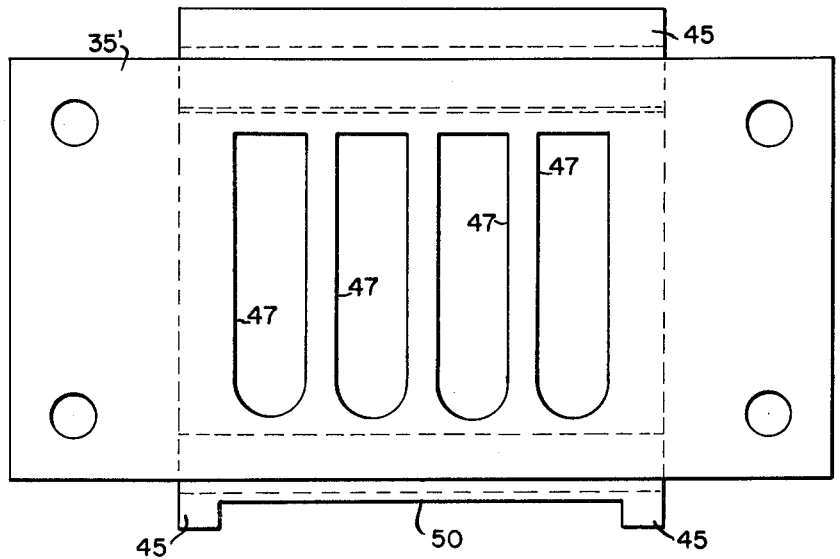
FIG. 11 is a rear view of a housing forming a part of the apparatus of FIG. 8.
Figure 12:
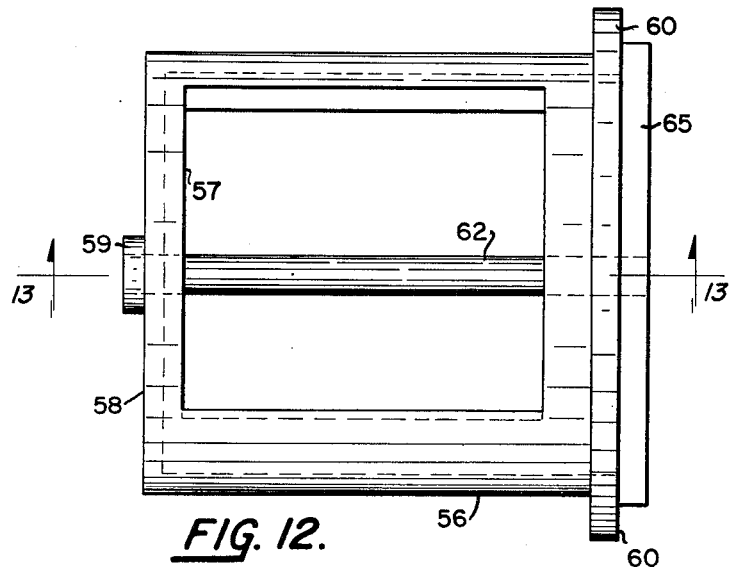
FIG. 12 is a bottom plan view of an inner fixed cylinder, forming a part of the apparatus of FIG. 8.
Figure 13:
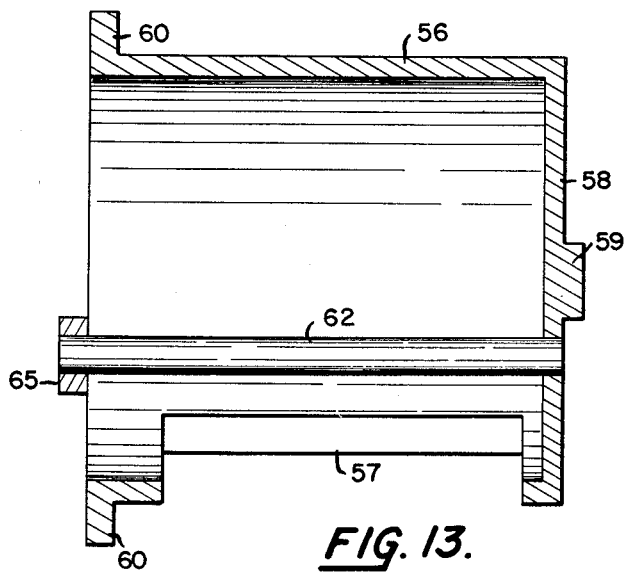
FIG. 13 is a vertical section, taken along line 13—13 of FIG. 12.
Figure 14:
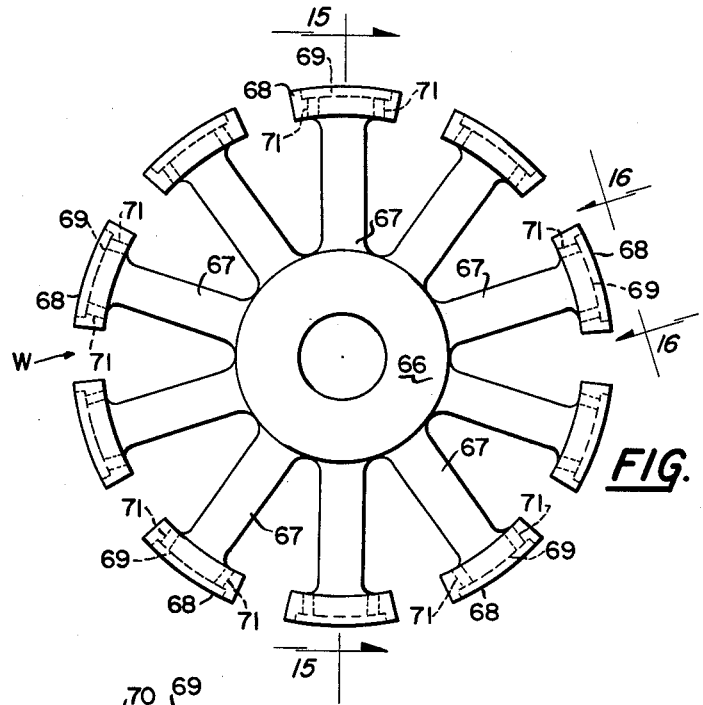
FIG. 14 is a side elevation, on an enlarged scale, of a pusher wheel, shown also in FIGS. 8 and 9.
Figure 15:
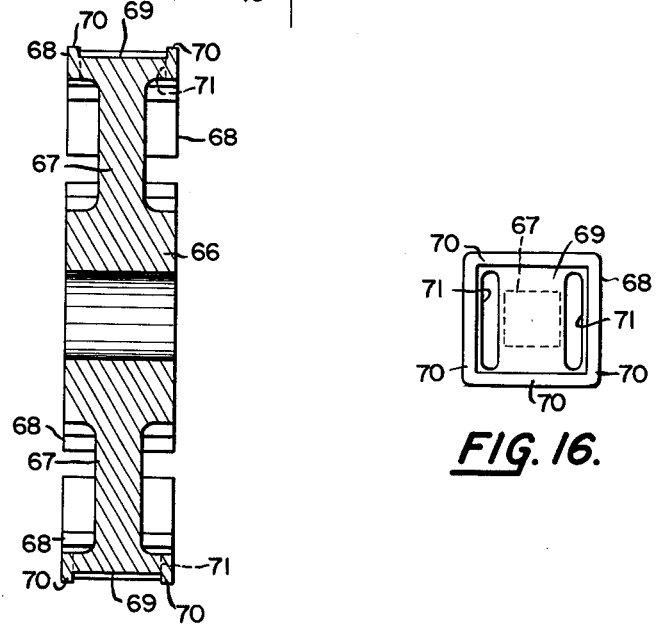
FIG. 15 is a radial section, taken along line 15—15 of FIG. 14.
Figure 16:
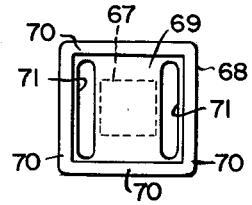
FIG. 16 is an end view, on an enlarged scale, of an arm of the pusher wheel of FIG. 14, such as taken from the position of line 16—16 of FIG. 14.

Disposed within cylinder 45 is the rotating sleeve 49 having a series of slots 48, as shown also in FIG. 10, which may be disposed in four transverse rows and fifteen circumferential rows, or in any other desired number of rows, either transverse or circumferential. Slotted sleeve 49 may be open at one end and closed at the opposite or drive end 51, conveniently being additionally provided with a flange 52 which rotates around the corresponding end of cylinder 45, as will be evident from FIG. 9. Slotted sleeve 49 may be driven from a drive shaft 53 provided with a driving disc 54 which may be connected to the drive end 51 of sleeve 49, as by a series of pins 55, so as to provide a removable drive connection so that the parts are readily disassembled for cleaning purposes. Slotted sleeve 49 rotates about a stationary cylinder 56 provided with a slot 57 shown also in FIGS. 12 and 13, having a width corresponding to the width of slot 50 in cylinder 45 and extending circumferentially for a distance, such as shown in FIG. 8, sufficient to accommodate the rotation of a series of pusher wheels W, described in greater detail later. One end 58 of cylinder 56 may be closed, as shown in FIGS. 9 and 13, and provided with a central, axially extending boss 59 which fits into a corresponding hole in closed end 51 of sleeve 49, to center the latter and form a bearing therefor. The opposite end of cylinder 56 may be provided with an outwardly extending, circumferential flange 60 by which the stationary cylinder 56 may be attached to housing cylinder 45, as by cap screws or in any other conventional manner. A hollow shaft tube 62, on which the wheels W rotate and in the central bore of which may be disposed a heater 63, supplied by electrical leads 64 to provide heat for conduction to wheels W, may be mounted within fixed cylinder 56. As in FIGS. 9, 12 and 13, one end of shaft tube 62 may be supported by the closed end 58 of stationary cylinder 56, while the opposite end may be supported by a bar 65 extending across the open end of cylinder 56 and attached thereto in any suitable manner, as by cap screws.

The pusher wheels W are adapted to push the items, such as pats of butter 20, out of slots 48 in sleeve 49 and, as indicated above, rotate freely on shaft tube 62, being carried around by sleeve 49. Each wheel W may, as in FIGS. 8, 14 and 15, include a hub 66 and a series of radially extending arms 67, each carrying at its outer end a pushing block 68 which not only pushes the respective items or pats 20 out of the respective slots 48, but also causes the wheels W to be rotated by sleeve 49. The center of rotation of the wheels W, i.e., the position of shaft tube 62, is preferably offset and below the center of rotation of slotted sleeve 49, as will be evident from FIGS. 8 and 13, so that blocks 68 will enter and then leave the slots adjacent the bottom of cylinder 49, the circumferential spacing of blocks 68 of each wheel W being the same as the circumferential spacing of slots 48 of sleeve 49, so that blocks 68 will register with successive slots. Through heat conducted from heater 63, the blocks 68 are heated and thereby heat the edges of and tend to move the items or pats 20 out of slots 48 more effectively. Each of blocks 68, as in FIGS. 14–16, may have a suitable periphery, such as rounded at the corners, so as to readily enter and leave slots 48, while each block 68 may be further provided with an end well 69 to form a rim 70, so that the rim 70 only of each block will contact the item or pat 20, as well as radial slots 71 to prevent a vacuum effect which might cause a pat to adhere to the block. For heat conduction purposes, wheels W are conveniently formed of a material having a high rate of thermal conductivity, such as a brass or bronze alloy, while tube 62 may be formed of similar material.

When the forming head including the housing H' and parts associated therewith is substituted for the forming head which includes the housing H of FIG. 1, the butter or other deformable material pushed by screws 11 of FIG. 1, or a single screw 11' of FIG. 18, into the slots 47 of FIGS. 8 and 9, will enter slots 48 in sleeve 49 and be carried around by the slots into the confined spaces formed by the respective slots between fixed cylinder 56 and the inner periphery of housing 45. As soon as a slot 48 reaches the slot 50 in cylinder 45 and slot 57 in fixed cylinder 56, a block 68 of the corresponding pusher wheel W will begin to enter the respective slot 48, to push the item or pat 20 onto the lower strip 18. In order to cause the items or pats 20 to adhere more readily to strip 18, a hollow chill plate 72, through which a refrigerating medium may be circulated in a conventional manner, may be disposed adjacent the lower end of slot 50, while chill plate 72 may be curved or arcuate as shown in FIG. 8, to form a guide for the lower strip 18. In addition, a hollow chill plate 73 may be disposed at a discharge end of housing H' so as further to chill the lower strip 18 and also act as a guide for its movement. The chill plate 72, particularly, enables faster production rates to be secured, since the adherence of the items or pats 20 to the chilled strip 18 causes pats 20 to be pulled away from the pushing blocks 68. Thus, the first method of this invention, such as described hereinbefore, may also include the novel step of chilling the strip onto which the items formed are placed, as well as the additional step of pushing the items out of the spaces in which they are formed. As will be evident, a chill plate, such as similar to chill plate 72 of FIG. 8, may be substituted for the feed roll 19 of FIG. 3.

The second method of this invention, as previously described, is particularly adapted to be carried out by the apparatus illustrated in FIGS. 17 and 18, in which a forming head including the housing H' and associated parts, is attached to the discharge end of hopper 10 mounted on a framework F', it being understood that the forming head including housing H of FIG. 3 and associated parts, may be substituted for the forming head H' shown in FIGS. 17 and 18. As before, the lower strip 18 may be fed from a supply roll 24, while an upper strip 21 may be fed from a supply roll 23 and around a feed roll 22 so as to be placed over the items or pats disposed on lower strip 18. The chill plate 72 may operate as described above, while chill plate 73 and a hollow chill plate 74 disposed above upper strip 21, forwardly of feed roll 22, may further chill the strips, producing not only continued adherence of the items to the strips, but also tending to prevent any softening or melting of the items when the strips are passed through a heat sealing device S, such as constructed in accordance with my copending application Ser. No. 611,793, now Patent No. 2,958,173. The chill plates 73 and 74 may, as in FIG. 17, be inclined upwardly at a suitable angle, such as approximately 15°, to permit the chill plate 73 particularly to act as a guide for the strip 18 as it leaves the region of the forming head and also to insure sufficient contact between strip 18 and chill plate 73, so that the desired chilling effect will be more readily produced. The sealing device S, as described in my copending application Ser. No. 611,793, reference to which is made for a more detailed description of the preferred construction thereof, involves a pair of rotating wheels or drums, between which strips 18 and 21 are fed and which seal strips 18 and 21 together around each individual item or pat, conveniently leaving an arcuate portion at one corner of each package unsealed so that, after the strips are cut apart, preferably centrally of the heat sealed layers, open tabs at the unsealed corners may be left to facilitate opening of the package by the ultimate user. It will be understood, of course, that heat sealing strips and the production of the food packages, as disclosed in my U. S. Patent 2,958,173, as well as the variations disclosed or indicated therein, may be used in the present invention. The drums or wheels of the heat sealing means S may be mounted on suitable transverse shafts, such as shafts 75 and 75', mounted between sides 76 of framework F' in suitable bearings, and may be rotated through gears 77 and 77'. As disclosed in my aforesaid copending application Ser. No. 611,793, the gears 77 and 77' may have slightly different pitch diameters, so that one of the heat sealing wheels, such as the upper wheel, may be driven at a slightly faster rate than the other wheel, so that a slight rubbing action will take place between the points of contact of the wheels with the strips 18 and 21, to insure a better seal between the strips. The gear 77 may be driven in any suitable manner, as through a pinion 78 driven by a belt 79 and associated pulleys from a motor 12'. In addition, a sprocket 80 is conveniently mounted on one end of the upper shaft 75', to drive, through a chain 81 and a sprocket 82, shaft 53 for sloted sleeve 49 of FIG. 9, which shaft may rotate in a bearing 83 mounted on one of the sides 76 of framework F'. Supply roll 23 may be mounted on a shaft 84 extending between the frame sides 76, while it will be understood that sprocket 82 may also be substituted for gear 31 of FIGS. 1 and 2 when the forming head including housing H is substituted for the forming head including housing H' of FIGS. 17 and 18.

Following passage through the heat sealing device S, the strips 18 and 21, which are now sealed together around each of the items, such as the butter pats disposed therebetween, may be passed between another set of chill plates, such as an upper chill plate 85 and a lower chill plate 85 and a lower chill plate 86 and thence through a longitudinal slitting device mounted on shafts 87 and 87'. The longitudinal slitting device may, as in FIGS. 18 and 19, include a series of discs, such as five, one more in number than the number of transverse rows of items sealed betwen the strips, such as four, and each including an upper cutting disc 88 offset from a lower cutting disc 89 mounted on the respective shafts 87 and 87', so that the shearing edge of cutting disc 88 will slide past the shearing edge of the cutting disc 89 a distance sufficient to insure that the strips will be slit along longitudinal lines. Conveniently, the face 90 of each disc 88 and 89 may be machined or otherwise formed as a shallow cone to provide clearance at the cutting edges. Also, a drawing disc 91 may be mounted against face 90 of each upper cutting disc 88 and a similar drawing disc 91' may be mounted against face 90 of lower cutting disc 89, the peripheral edge of lower drawing disc 91 cooperating with the peripheral edge of cutting disc 89 and the peripheral edge of drawing disc 91' similarly cooperating with the peripheral edge of cutting disc 88, to pull the strips between the cutting edges and also to maintain the sealed assembly taut between the cutting device and the heat sealing device S.

Following passage through the longitudinal slitting device, each longitudinal series of packages containing the individual items may then be cut apart by passage through a transverse cutting device, which may include an upper blade roll 92 and a lower backing roll 93, mounted on shafts 94 and 94', respectively. The blade roll 92 may be constructed as shown in FIG. 20, being provided with a series of longitudinal slots in which blades 94 are disposed, each blade 94 conveniently being adjustable radially by two or more adjusting screws 95 extending through roll 92 from the opposite side to engage the inner edge of the corresponding blade 94, each of which is adapted to be locked in position by two or more set screws 96, accommodated by triangular longitudinal slots 97 corresponding in number to the number of blades. As will be evident, the adjusting screws 95 should be placed in staggered relation along the length of roll 92 to prevent interference by one with another and set screws 96 may be correspondingly spaced. Each backing roll 93, as in FIG. 20, may be provided with a series of rectangular wells 98, corresponding in position to the items sealed between the strips and thereby adapted to accommodate the same, as the sealed strips, already severed longitudinally, move through the transverse cutting device. Each well 98 is bounded by longitudinal ribs 99 and circumferential ridges 100, which of course may be integral at their points of intersection, while the angular relationship of the blade roll 92 and backing roll 93 are correlated and these rolls are also driven at the same speed, so that the cutting edge of each blade 94 will engage a longitudinal rib 99, as shown, to separate each package 101 from the next package 101'. As will be evident, as each package 101 is severed from the longitudinal, sealed assembly produced by the longitudinal slitting device, it will have a leading edge 102 at which the upper and lower strips are sealed together.

From the transverse cutting device, the individual packages may be fed into a receptacle or carton for receiving the same or into a comparatively large container if the packages are to be shipped, or may be transferred to a conveying device, such as the conveying device C, also constructed in accordance with this invention, for placement in suitable cartons. The conveying device C, illustrated generally in FIGS. 17 and 18, is adapted to remove the individual packages from the transverse cutting device and place them automatically in containers or cartons 105, which may be rectangular in shape, having an open top and an end flap 106, adapted to be closed after each carton has been filled. The device C, driven at a speed which is synchronized with the speed of the transverse cutting device, so that each package 101 may be picked up by its leading edge 102, carries the packages past an air chill plate 107, shown also in FIG. 21 and deposits them in a carton 105. Conveniently, the conveying device C is inclined downwardly, so that a stack of cartons 105 may also be inclined downwardly, the uppermost carton tending to slide downwardly, as it is filled and its weight therefore increases, along the top of the next carton below, so that when a predetermined weight of packages 101 have been placed therein, the uppermost carton 105 will slide off the stack, as onto a table, where the end flap 106 may be closed and a cover placed over the carton, if desired. Each stack of cartons 105 may be supported in a suitable manner, as by a base 108 having an inclined top and an end plate 109, to permit only the uppermost carton 105 to slide, the base 108 conveniently being pressed upwardly by a spring 110, so that as soon as the uppermost carton slides off the stack, the carton next below will be moved into position to receive the packages 101.

The conveying device C conveniently includes a series of chain and block assemblies, each of which may comprise an endless chain 114 to each alternate link of which a block 115 is attached, as in FIG. 22, the chain and block assemblies being equal in number to the transverse rows of packages 101 and each series of blocks 115 being adapted to receive packages 101 of the respective row in succession and carry them from the transverse cutting assembly, which includes the blade roll 92, past the air chill plate 107 and release the packages so that they will fall into the uppermost carton 105. Thus, each chain 114 may pass around an upper sprocket 116, mounted on a shaft 117, and a lower sprocket 118, mounted on a shaft 119, as well as between the sprockets. The blocks 115 may have a suitable width, such as indicated in FIG. 18, and a length corresponding to the pitch distance of the chain, so that, on a straight run, as between the respective sprockets 116 and 118, the end of each block will tend to abut against the end of each adjacent block. However, as the chain links and the respective blocks attached thereto pass around the upper sprocket 116, as will be evident from FIGS. 21 and 22, the blocks will be pivoted apart and a triangular space between the ends of the adjacent blocks will open up. Conveniently, as shown in FIG. 21, the center line of sprocket 116 is spaced slightly above the path of movement of the strips between the rolls 92 and 93, so that as the leading edge 102 of a package 101 which is severed from the strip engages the space between the ends of two of the blocks 115, the space will be moving toward a closed position. Also, due to the conveniently triangular configuration of this space, and since the package may be traveling forwardly at a rate of speed which can be relatively high for production apparatus, the leading edge 102 of the package will tend to be wedged into the space between the adjacent ends of blocks 115. Thus, as blocks 115 move further around with the upper sprocket 116, in the direction of the arrow of FIG. 22, the ends of the adjacent blocks 116 will close on the leading edge 102 of the package and grip or clamp the leading edge, so that as the chain blocks move further and into the downward run to lower sprocket 118, packages 101 will be suspended by the chain blocks. Also, when the chain blocks begin to move around with lower sprocket 118, the adjacent ends of the blocks will begin to separate and as soon as a discharge position has been reached, such as slightly before reaching the longitudinal axis of the chain device, the ends of the adjacent blocks will be separated sufficiently that edge 102 of each package 101 will slip from between the blocks and the package will thus automatically fall into the uppermost carton 105. It is to be noted that while leading edge 102 of each package 101 could be inserted into the space between two of the blocks 115 at the upper longitudinal center line, there would be more difficulty in causing the packages to fall out at the lower or discharge end, since the dimensions of the space between the blocks for entrance and discharge should be slightly larger for the latter.

The conveyor device is preferably driven in synchronization with plate roll 92, as by a gear drive arrangement, and the position of sprockets 116 and 118 on the respective shafts is preferably adjusted so that blocks 115 are in the desired position, such as that shown in FIG. 22, when each package 101 reaches the position in which the leading edge 102 will intercept the path of travel of the chain blocks. The shafts 117 and 119 of the conveying device C may be driven by any suitable conventional gearing arrangement, which has therefore not been shown, while the shafts 87, 94 and 94' may be driven through a gear and chain arrangement from the motor 12', in a conventional manner and therefore also not shown. The shafts 117 and 119 may be adjustable toward and away from each other, as by a pair of bearings 120 on each shaft and each provided with a sleeve 121 adapted to receive the end of a rod 122 which may be adjusted inwardly and outwardly in the sleeves 121 by the nuts 123. Preferably, the upper sprocket 116, and particularly the shaft 117 therefor, is adjusted so that the desired relationship with respect to the transverse cutting or blade roll 92 and its backing roll 93 are secured, while nuts 123 and rods 122 are used in adjusting the position of lower sprockets 118, so that a desired tension on chains 114 is obtained. It will be noted that by changing the tension on the chains, the gripping action of blocks 115 can be altered, since a relatively loose chain will not produce as great a clamping pressure between the ends of adjacent block 115 as will a comparatively tight chain. Thus, the tension of the chain may also be adjusted in order to achieve the optimum pickup and transfer action of the conveying device C in accordance with the desired production rate. The rear end of the conveying device C may also be supported from above, as by adjustable and pivoted rods extending to the bearings 120 or in any other suitable manner.

Figure 24:
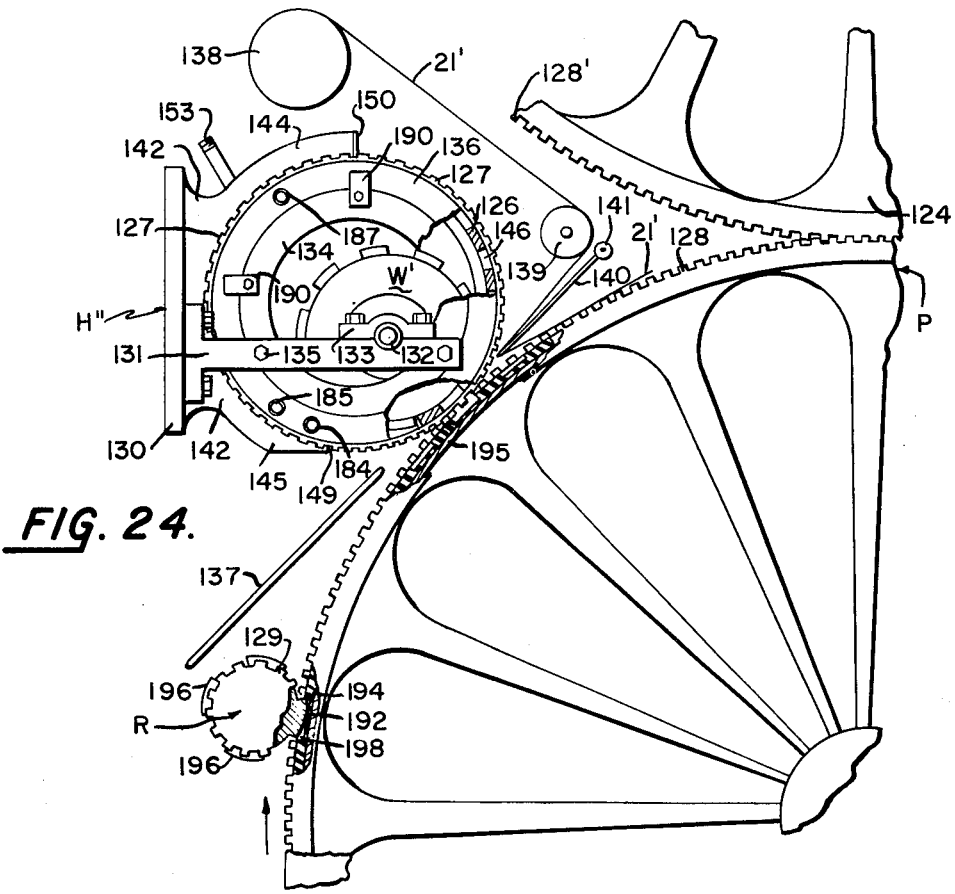
FIG. 24 is a fragmentary side elevation, on an enlarged scale and with certain parts broken away for clarity of illustration, showing a better extrusion head and a portion of a heat sealing wheel of the apparatus of FIG. 23.

A third form of apparatus, shown in FIGS. 23–28, operates in a manner similar to the previous embodiments by the extrusion of butter pats from an extrusion head against a lower strip or sheet 18′, conveniently formed of metal foil and paper, in which pockets are formed by a pocket forming roll R of FIG. 24, operating against a pocket wheel P, onto which the strip 18′ is fed from below. Immediately after placement of the pats 20 in the pockets in strip 18′, an upper strip 21′, conveniently formed of pliofilm, polyethylene or other heat sealable material, conveniently transparent, is placed thereon and both strips, with the butter pats between, pass around pocket wheel P and then between the pocket wheel and a heat sealing drum 124 of FIG. 23 directly above the same, which may be constructed as in my U.S. Patent No. 2,958,173, to produce a series of longitudinally and laterally spaced seals in the completed strip 125, which is preferably cut or partially cut apart later between the pats, as in the manner previously described. As before, the butter is placed in hopper 10 supported by a frame F″ and having outwardly flaring, upper flanges 34 and is moved by screws 11 into housing H″. Screws 11 are driven by a drive arrangement 13, in turn driven by a motor beneath the same, as in FIG. 2. A slotted sleeve 126, having gear teeth 127 at each side, is driven from pocket wheel P having a gear 128 at each side, by gear teeth 127 intermeshing with the teeth of gear 128, while pocket forming roll R and heat sealing drum 124 are also driven by pocket wheel P, as by a gear 129 at each side of roll R intermeshing with gears 128 and a gear 128′ at each side of drum 124 intermeshing therewith. the lower pocket wheel P is driven by a motor and suitable drive arrangement, by which the cutting and slitting mechanism is also conveniently driven, the drive motor therefore conveniently being located beneath pocket wheel P.

Figure 23:
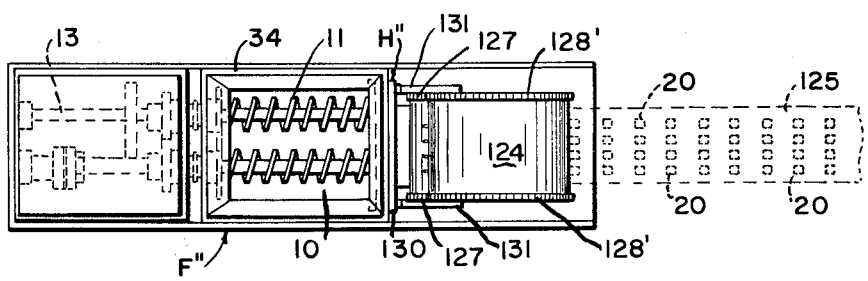
FIG. 23 is a top plan view, similar to FIG. 1, illustrating a third embodiment of this invention.

As in FIGS. 23 and 24, the housing H″ has a rear flange 130 attached to the front wall of hopper 10 and to which a bracket 131 is attached at each side to extend forwardly for supporting a fixed shaft 132 for a pusher wheel W′, clamped thereto by a block 133, and also for supporting the end flanges 134 of a stationary cylinder, described later, as through cap screws 135. Slotted sleeve 126 rotates about an annular bearing ring 136 at each side, each bearing ring conveniently being formed of Teflon, nylon or other suitable material. A drip pan 137 extends angularly upwardly beneath the extrusion head, to prevent water or butter from dripping on strip 18′. Lower strip 18′ is fed upwardly from a suitable feed roll, while the upper strip is fed from a supply roll 138, past a tension roller 139 and around the end of a guide bar 140 which is mounted on a transverse rod 141 and extends between sleeve 126 and pocket wheel P, so that upper strip 21′ is placed over the butter pats immediately after they are pushed into the pockets of the lower strip.

Figure 25:
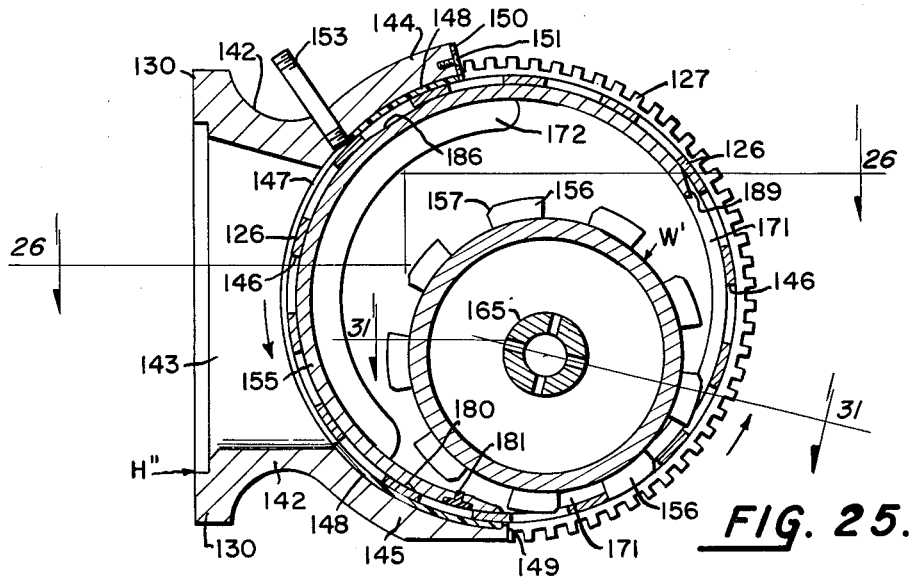
FIG. 25 is a vertical section, on a further enlarged scale, of the extrusion head of FIG. 24.
Figure 26:
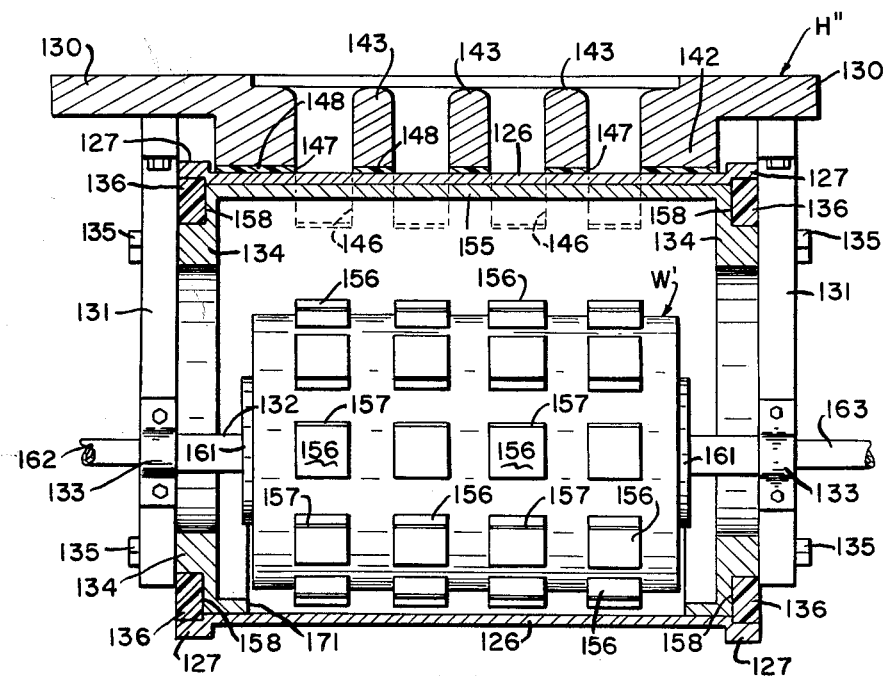
FIG. 26 is a horizontal, offset section, taken along line 26—26 of FIG. 25.
Figure 27:
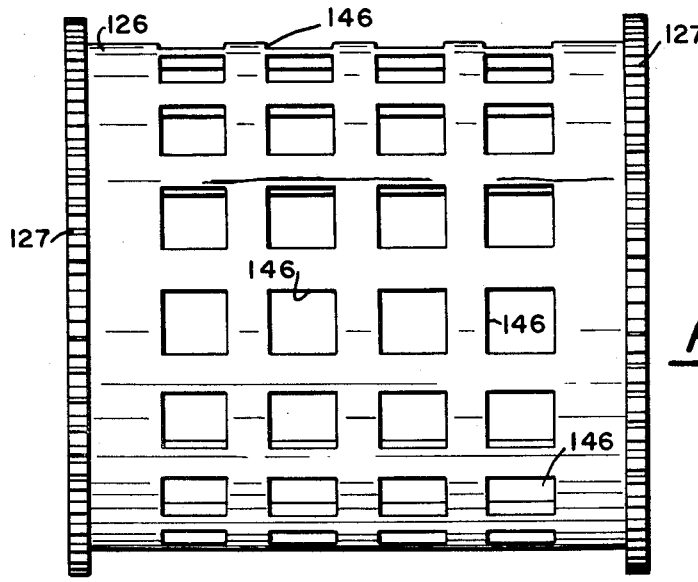
FIG. 27 is an enlarged top plan view of a rotating sleeve of the forming head of FIGS. 25 and 26.
Figure 28:
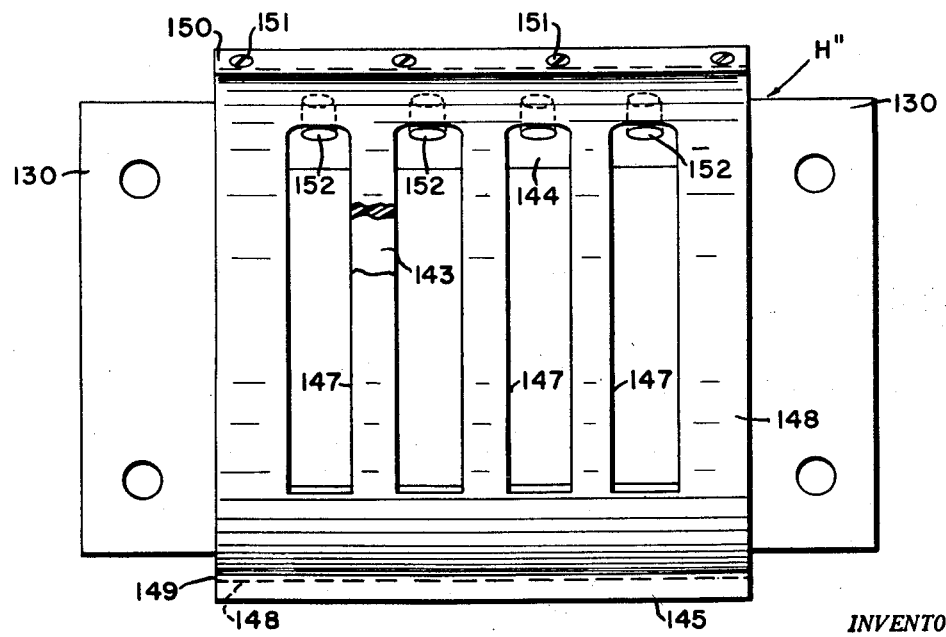
FIG. 28 is an enlarged rear elevation of an extruder housing of the apparatus of FIGS. 23 and 24.

As in FIGS. 25 and 26, housing H″ has a neck 142, a series of slots therethrough between vertical ribs 143, an upper flange 144 and a lower flange 145, each flange having an arcuate inner contour corresponding to the diameter of sleeve 126. Sleeve 126, as in FIG. 27, is hollow and is provided with a series of circumferentially spaced, rectangular slots 146 which are placed in lateral rows, such as four in number, and correspond to the size of the pats to be produced. The butter is moved by screws 11 through the slots between ribs 143 in housing H″ and then through vertical slots 147 in an arcuate liner 148 which is mounted in the front face of housing H″, as in FIG. 28, and is held against rotation by a lip 149, as in FIG. 25, at the lower end of flange 145, on the inside. Liner 148 is conveniently formed of Teflon, nylon or other suitable material, to form a bearing for sleeve 126, which rotates in the direction of the arrow of FIG. 25. As in FIGS. 25 and 28, the end of flange 144 is provided with a scraper 150, conveniently attached thereto by screws 151, which holds the upper end of liner 148 in position and scrapes the outer surface of sleeve 126 to remove any accumulation of butter therefrom. Scraper 150 is also conveniently formed of Teflon, nylon or other suitable plastic or the like. Advantageously each slot 147 in liner 148 extends upwardly past the lower edge of flange 144, as in FIG. 28, to uncover a hole 152, in each of which a pipe 153 of FIG. 25 may be installed, to permit air which is introduced with the butter to be dispelled therethrough. In actual practice, however, small amounts of butter may also be extruded through pipes 153, necessitating the provision of additional means, such as flexible tubes, leading to a suitable receptacle for catching the butter. Alternatively, pipes 153 may be provided with elbows at the outer ends thereof, having nipples extending to a pan or other receptacle which may be placed above housing H″.

Figure 29:
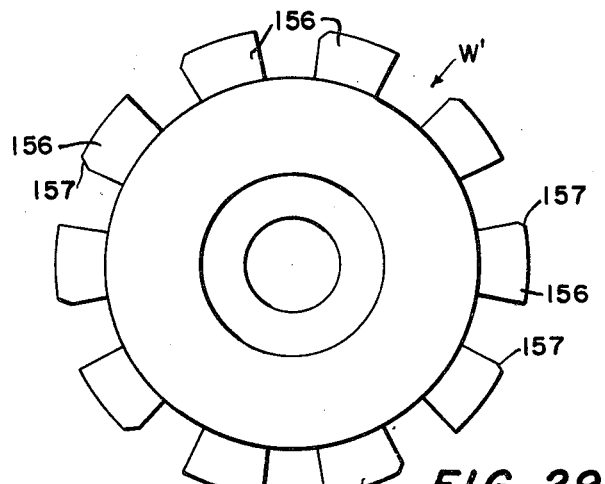
FIG. 29 is a further enlarged side elevation of a pusher wheel of the head of FIGS. 25 and 26.
Figure 30:
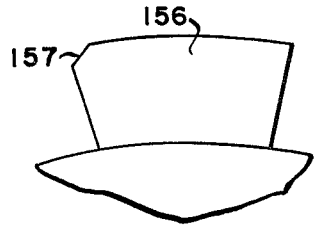
FIG. 30 is a still further enlarged, fragmentary side elevation showing one of the pusher blocks of the pusher wheel of FIG. 29.
Figure 36:
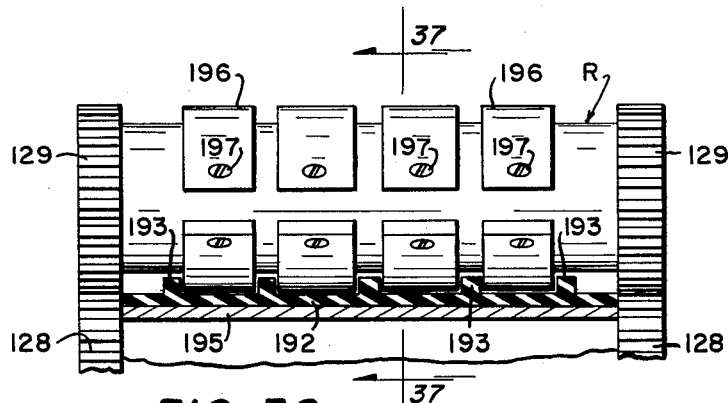
FIG. 36 is an enlarged, vertical section of a pocket forming roller of the apparatus of FIGS. 23 and 24 and showing a fragmentary portion of a cooperating wheel.
Figure 37:
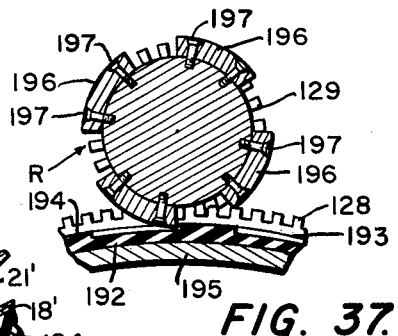
FIG. 37 is a vertical section, taken along line 37—37 of FIG. 36.

The butter is forced through slots 147 in liner 148 and into slots 146 of sleeve 126 against a stationary cylinder 155 to form the butter pats. After forming, the butter pats are pushed out of slots 146 by pusher wheel W′, which is eccentrically mounted within sleeve 126 and has circumferentially and laterally spaced blocks or feet 156, having a peripheral spacing corresponding to slots 146 and each adapted to extend through a slot 146 in sleeve 126 to push the patties out of slots 146 and onto the lower strip 18′, as in FIGS. 24 and 38. Through engagement of blocks 156 with slots 146 in rotating sleeve 126, pusher wheel W′ is rotated by sleeve 126 about fixed shaft 132. Also, for clearance upon movement of each block out of the corresponding slot in the rotating sleeve, and leading edge of each block, as in FIGS. 29 and 30, is preferably provided with a bevel 157. The movement of pusher blocks 156 into and out of slots 146 can best be visualized by viewing FIG. 25, wherein the forward or beveled end of each pusher block 156 enters a slot to push a butter pat 20 from the slot onto strip 18′. Thus, as sleeve 126 and pusher wheel W′ continue to rotate, the forward or beveled end of the pusher blocks are the first part of each block withdrawn from the slot. Thus, if bevels 157 were not provided, it would be necessary to make the slots 146 considerably larger to accommodate the angular movement of blocks 156 with respect to slots 146, which would allow the butter to pass between the pusher blocks and the slots. Each side flange 134 of cylinder 155 is provided with an outer slot 158, as in FIG. 26, for receiving bearing 136, about which sleeve 126 rotates, while cylinder 155 is held stationary by cap screws 135, as indicated.

Figure 31:
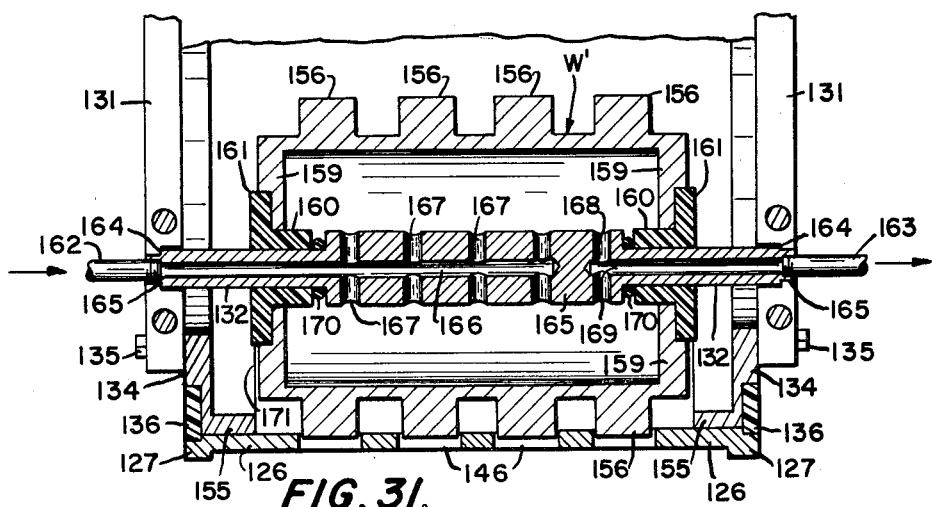
FIG. 31 is a horizontal section, on a slightly enlarged scale, taken along line 31—31 of FIG. 25.

Pusher wheel W′ is hollow, as in FIG. 31, so that warm water may be circulated therethrough to prevent any tendency for the butter pats to adhere to pusher feet 156, while each end wall 159 of the pusher wheel engages a cylindrical bearing 160 having an outer flange 161 which engages a corresponding groove in the end wall. Bearings 160 are conveniently nylon or Teflon, or other suitable plastic which do not require lubrication by oil or grease. For water circulation, an inlet pipe 162 may be threaded into one end of shaft 132, which is hollow, and an outlet water pipe 163 threaded into the opposite end. Pusher wheel W' is assisted in being maintained in a centered position by bearings 160, in turn assisted by shaft 132, which may be provided with a shoulder 164 at each end which engages a corresponding shoulder in a semicircular well 165 in bracket 131 and a similar well in the underside of block 133 of FIGS. 24 and 26. Shaft 132 is also conveniently provided with an enlarged central portion 165 which is solid closer to the inlet end than the outlet end. Thus, as indicated by the arrows of FIG. 31, hot water from inlet pipe 162 enters a central inlet bore 166 and passes into wheel W' through transverse passages 167, conveniently made by drilling. After the wheel is filled with water, the water pressure will cause water to leave wheel W' through transverse passages 168, which are in communication with an outlet bore 169, conveniently drilled from the opposite end as bore 166 but stopping short thereof to leave the undrilled portion or solid plug. An O-ring 170, at each end of the enlarged central portion of shaft 132, engages the inner end of the corresponding bearing 160, to space the bearings from the central portion of the shaft and permit them to turn more freely about the shaft.

Cylinder 155 is provided with a slot 171, as in FIGS. 25 and 34, which extends for a sufficient distance around the rear thereof, such as from 100° to 135°, to accommodate the discharge of the pats from the slots in rotating sleeve 126 and particularly pusher wheel W'. Conveniently, a hollow, curved water jacket 172 is mounted on the inner surface of cylinder 155 adjacent housing H", through which hot water is circulated to heat cylinder 155 so that butter will not adhere to the cylinder as the pats are formed. Actually, the butter which is against cylinder 155 will soften or melt slightly to provide a lubricant, as it were, between the butter pat and the cylinder so that sleeve 155, which carries the butter pats, can rotate freely. As in FIGS. 32 and 33, the water jacket is divided into three sections by a pair of parallel baffles 173 which extend upwardly from the lower end and are spaced from the top, so that hot water entering the end sections of the water jacket will very nearly fill the end sections before flowing into the center section. As also shown in FIG. 34, water enters through an L 174 which is connected to the end of a tube 175, such as copper, which extends across the water jacket and downwardly and into the bottom of the far end section; while another tube 176 is joined to tube 175 adjacent L 174 and extends downwardly into the lower end of the opposite end section of the water jacket. An outlet tube 177, which may also be copper, is connected at the bottom of the center section of the water jacket, between the baffles, and terminates in an L 178, which may be connected to a suitable outlet, such as to a heater and pump for reheating and recirculating the water through the water jacket. The water jacket, which will be almost completely filled with hot water at all times to assure uniform heating of cylinder 155, is preferably formed of heat conducting material, such as copper.

As sleeve 126 rotates, it carries the pats of butter between lower flange 145 of housing H" and cylinder 155. However, before reaching slot 171 in the cylinder, the butter pats pass across a groove 180 cut across the underside of cylinder 155, as in FIGS. 25 and 34, to let air out of the butter, and then a scraper 181, which also extends across the cylinder and scrapes away any excess butter. Scraper 181 is conveniently formed of plastic and is attached to the underside of the cylinder by countersunk screws. Each bearing ring 136, as in FIG. 35, is provided with a lower pair of tapped holes 183 and 184, in alignment with the ends of slot 180 and scraper 181, respectively, for discharge of air removed at slot 180 and butter removed by scraper 181, respectively. Such discharge may be through pipes 184 and 185 of FIG. 24, mounted in tapped holes 182 and 183, respectively, of FIG. 35. If desired, vacuum may be applied to pipes 184 and 185, for positive removal of air and excess butter, respectively, as previously indicated. After the butter pats have been deposited on the lower strip 18', any butter which may cling to the outer surface of sleeve 126 conveniently will be scraped off by scraper 150, while a flat 186 of FIG. 25, extending across cylinder 155, permits the removal of air from the inside of sleeve 126. This may be accomplished by a pipe 187 of FIG. 24, mounted in a tapped hole 188 in each Teflon bearing 136, as in FIG. 35. The upper edge of slot 171 is conveniently provided with a bevel 189, to prevent butter from hanging onto the edge of the slot. Bearings 136 are conveniently held in position by clamps 190 of FIG. 24, mounted on flange 134 of the stationary cylinder, as by cap screws as shown, while at least one clamp 190 on each side is conveniently provided with an inwardly extending pin engaging a hole in the bearing, such as hole 191 of FIG. 35, to prevent rotation of the bearings and insure alignment of pipes 184, 185 and 187 of FIG. 23 with groove 180, scraper 181 and flat 186, respectively, of FIG. 34.

As indicated, lower strip 18' is fed around pocket drum P from a roll of material, not shown, and pockets are formed therein by pocket forming roll R. Also as indicated, lower strip 18' is conveniently formed of metal foil having a paper facing, so that pockets formed in the lower sheet will retain their shape after leaving the pocket forming roll. For this purpose, pocket wheel P is provided with a ring 192, conveniently molded from silicon rubber or other suitable material and provided with integral, laterally spaced ribs 193 of FIG. 36, and integral, circumferentially spaced ribs 194 of FIGS. 37 and 38. Ribs 193 and 194 form a honeycomb surface with pockets which are slightly larger than the size of the butter pats. Ring 192 slips onto drum or cylinder 195, before attachment of gears 128; thus, both ring 192 and drum 195 extend between the gears. As in FIGS. 36 and 37, roll R is provided with a plurality of laterally and circumferentially spaced blocks 196, attached thereto by countersunk screws 197, which force the lower strip 18' between ribs 193 and 194 causing pockets 198 of FIG. 38 to be formed in strip 18'.

Figure 38:
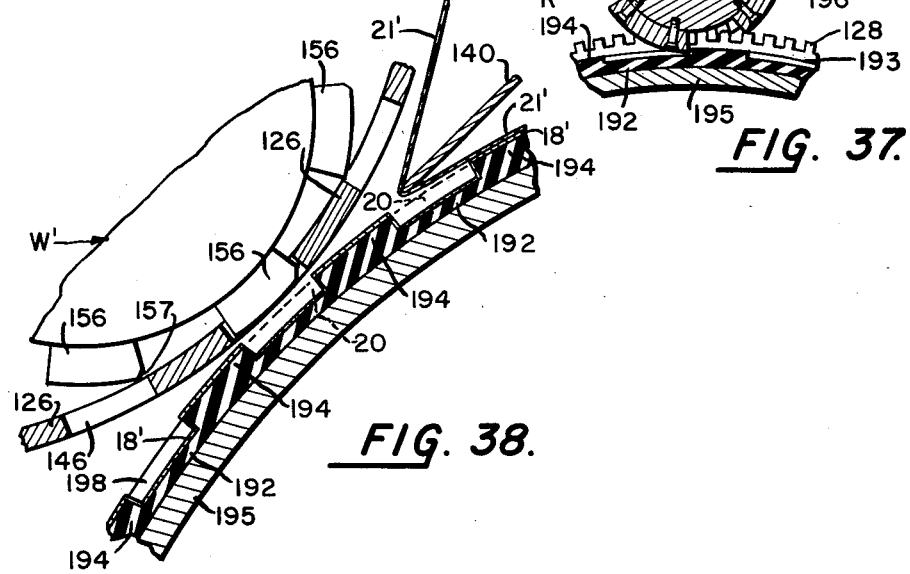
FIG. 38 is an enlarged, fragmentary vertical section showing the placement of butter pats between strips of heat sealable material, by the pusher wheel of FIG. 29 and associated parts.

As illustrated in FIG. 38, as sleeve 126 rotates into engagement with pusher wheel W', the butter pats 20 in slots 146 of the sleeve are pushed out of the slots and into pockets 198 of strip 18'. As immediately as possible, upper strip 21' is placed on the lower strip, so that tension of strip 21' against the pats will hold them in the pockets until the strips can be heat sealed together. Thus, the lower end of guide bar 140 is rounded and the guide bar is relatively thin, so that the lower end of bar 140 can approach closely to the area of deposition of the butter pats in the pockets in lower strip 18'.

From the foregoing, it will be evident that the methods and apparatus of this invention fulfill to a marked degree the requirements and objects hereinbefore set forth. As will be evident, the forming head of FIG. 3, of FIG. 8 or of FIG. 24 may be used in producing individual items from deformable material, each in conjunction with a suitable feed device, such as a hopper provided with augers or screws, and is also adapted to carry out the method of this invention. Through the rotation of the respective slotted sleeves, the deformable material may be pushed into a space having a size comparable to that of the item desired and, as the respective slotted sleeve moves around the inside of a housing cylinder, a space confining the material will be formed. The items are readily delivered onto a strip such as formed of heat sealing material, in both laterally and longitudinally spaced relation, particularly when the strip is moved at the same or perhaps slightly greater speed than the peripheral speed of the slotted sleeve. Also, by applying heat to the side edges of the spaces in which the successive items are contained, or to a pushing device which moves the items out of the spaces, readier removal of the items is secured and there is less tendency for any individual item to stay with the slotted sleeve or other means for forming the space. Furthermore, when the strip receiving the items is chilled, the tendency for the items to adhere to the strip is enhanced, which further assists in removing the items from a space forming means, such as the slotted sleeve. Thus, a feed roll over which the strip for receiving the items may pass, and particularly a chill plate which may be arcuate or may be circular and mounted for rotation, tend to increase the speed at which the method and apparatus of this invention may be operated. Furthermore, by placing an additional strip on top of the items disposed in spaced relation on a lower strip, the strips with the items disposed therebetween may readily be fed to a heat sealing device, so as to seal the strips together around the individual items. In addition, the longitudinal rows of items may be cut apart by a longitudinal severing device and then the individual packages finally produced by a transverse severing device, while the individual packages may be transferred by a conveying apparatus to cartons or the like for packaging. As will be evident, the association of the above apparatus elements is particularly adapted to carry out the second and third methods of this invention which includes the first method and the variations thereof, as well as the additional steps of placing another strip on top of the items, sealing the strips together around the individual items, serving the strips longitudinally and then laterally about the items and preferably within the layers or areas at which the strips have been sealed together. Such method may include the further step of picking up each individual item and conveying it to a carton, container or the like adapted to receive the same. The novel conveying apparatus of this invention is particularly adapted to carry out the last mentioned step, since it may be operated in synchronization with the transverse severing means and the blocks attached to the individual chain links are adapted to open up when passing around one sprocket, to grasp the edge of an individual package therebetween, the packages being conveyed in succession to the position of another sprocket, where the blocks may again be opened up to discharge the packages. It will be noted that all moving parts of the apparatus of this invention may have rotating motion and that the difficulties encountered with cams, or other types of machine elements for producing reciprocating motion, may thus be avoided.

As will be evident, through proper adjustment, the apparatus of this invention is particularly adapted to carry out each of the above methods in a highly effective manner. Also, the weight of each of the items so produced may be adjusted, as by the speed of operation, as well as by the size of the spaces in which the individual items are formed. In addition, slight variations in the density of the deformable material, such as butter, may be accommodated by certain variations in the speed of the different parts of the apparatus. For instance, butter produced at different times of the year may vary in density and when a higher density is encountered, the speed of the augers 11 of FIGS. 1, 18 and 23, for instance, may be reduced, since the weight of the individual items will increase when the augers are turned faster. Or, the speed of rotation of the sleeve 25 of FIG. 8 or sleeve 49 of FIG. 8 or sleeve 126 of FIG. 25 may be increased, upon an increase in density of the butter since, in general, when the rate of rotation of the sleeve is increased, the weight of the individual items will decrease. For this purpose, it may be desirable to regulate electronically the speed of the motor, such as motor 12 of FIG. 2 and motor 12' of FIG. 17, so that the augers or screws 11 may be turned at a rate of speed corresponding to the variations in density of the material, such as butter, but at the same time, the speed of the slotted sleeves may also be controlled. It will be understood, of course, that from the slotted sleeve onward, all the parts are preferably driven in synchronization, although some parts are preferably rotated at greater or lesser speeds than others, such as the upper wheel of the sealing means S being driven at a higher rate than the lower wheel and the longitudinal slitting rolls driven at a slightly faster rate, so as to maintain adequate tension on the strips, but in general, any change in the speed of rotation of the slotted sleeve should be reflected in a corresponding change in the speed of the parts following.

Although specific embodiments of the apparatus of this invention have been illustrated and described, and numerous variations therein shown or indicated, and certain forms of the apparatus is particularly adapted to carry out the method of this invention, it will be understood that other apparatus may be used in carrying out such method and that other embodiments of such apparatus may exist, as well as additional variations and changes being made therein, all without departing from the spirit and scope of this invention.

What is claimed is:

1. Apparatus for forming individual items of deformable material, comprising a housing having a cylindrical section disposed transversely at one end, an entrance section and a slot through which such material may be pushed from said entrance section into the interior of said cylindrical section, said cylindrical section having an exit slot spaced from said entrance slot; a cylindrical sleeve engaging the interior of said cylindrical housing section and provided with at least two circumferential rows of slots having a size corresponding to the size of the individual items to be formed; means for rotating said sleeve; and a stationary member within said slotted sleeve and engaging said sleeve opposite at least said entrance slot and between said entrance slot and said exit slot.

2. Apparatus for forming individual items of deformable material, as defined in claim 1, wherein said member within said sleeve is provided with a slot corresponding in position to said exit slot of said cylindrical section; and including means for pushing said items out of said sleeve slots and into said exit slot.

3. Apparatus for forming individual items of deformable material, as defined in claim 2, wherein said pushing means comprises at least one wheel rotatable interiorly of said member within said slotted sleeve, and provided with a series of circumferentially spaced blocks corresponding in configuration to said sleeve slots and adapted to enter said sleeve slots.

4. Apparatus for forming individual items of deformable material, as defined in claim 3, wherein said pushing wheel has a lesser diameter than said member within slotted sleeve and said pushing wheel rotates about an axis offset from the center of rotation of said slotted sleeve in a direction toward said exit slot.

5. Apparatus for forming individual items of deformable material, as defined in claim 3, including means for supplying heat to said blocks.

6. Apparatus for forming individual items of deformable material, as defined in claim 5, including a hollow shaft for said pushing wheel; and heating means within said hollow shaft.

7. Apparatus for forming individual items of deformable material, as defined in claim 5, wherein each said block is provided with a radially extending rim around the lateral edges thereof, forming a well bounded by said rim, and at least one radial slot extending into said well and open at the end thereof opposite said well.

8. Apparatus for forming individual items of deformable material, as defined in claim 5, wherein said heat supply means includes hot water passage means in said pusher wheel.

9. Apparatus for forming individual items of deformable material, as defined in claim 3, wherein the forward edge of each block is beveled.

10. Apparatus for forming individual items of deformable material, comprising a housing having a cylindrical section disposed transversely at one end, an entrance section and a slot through which such material may be pushed from said entrance section into the interior of said cylindrical section, said cylindrical section having an exit slot spaced from said entrance slot; a cylindrical sleeve engaging the interior of said cylindrical housing section and provided with at least two circumferential rows of slots having a size corresponding to the size of the individual items to be formed; means for rotating said sleeve; and a member within said slotted sleeve and engaging said sleeve opposite at least said entrance slot and between said entrance slot and said exit slot.

11. Apparatus for forming individual items of deformable material, comprising a housing having a cylindrical section disposed transversely at one end, an entrance section and a slot through which such material may be pushed from said entrance section into the interior of said cylindrical section, said cylindrical section having an exit slot spaced from said entrance slot; a cylindrical sleeve engaging the interior of said cylindrical housing section and provided with at least two circumferential rows of slots having a size corresponding to the size of the individual items to be formed; means for rotating said sleeve; a member within said slotted sleeve and engaging said sleeve opposite at least said entrance slot and between said entrance slot and said exit slot; and means for moving a strip past said exit slot to contact and receive said items in spaced relation on said strip.

12. Apparatus for forming individual items of deformable material, as defined in claim 11, wherein said exit slot forms means for guiding said strip prior to contact with said items.

13. Apparatus for forming individual items of deformable material, as defined in claim 11, including means for chilling said strip prior to contact with said items.

14. Apparatus for forming individual items of deformable material, as defined in claim 13, wherein said chilling means comprises a hollow chill plate having a curved outer periphery for guiding said strip to said exit slot and adapted to receive a refrigerating medium for circulation therethrough.

15. Apparatus for forming individual items of deformable material, comprising a housing having a cylindrical section disposed transversely at one end, an entrance slot and a slot through which such material may be pushed from said entrance section into the interior of said cylindrical section, said cylindrical section having an exit slot spaced from said entrance slot; a cylindrical sleeve engaging the interior of said cylindrical housing section and provided with at least two circumferential rows of slots having a size corresponding to the size of the individual items to be formed; means for rotating said sleeve; a fixed member within said slotted sleeve engaging said sleeve opposite at least said entrance slot and between said entrance slot and said exit slot; and a cylindrical drum having at least two rows of circumferentially spaced blocks corresponding in configuration to said sleeve slots and adapted to enter said sleeve slots for pushing said items out of said sleeve slots and into said exit slot.

16. Apparatus for forming individual items of deformable material, as defined in claim 15, wherein said drum is mounted for rotation on a shaft extending centrally therethrough and laterally beyond the ends of said sleeve; and bearing means attached to said housing and rotatably supporting said shaft.

17. Apparatus for forming individual items of deformable material, as defined in claim 16, including a longitudinal inlet bore extending inwardly from one end of said shaft; at least one transverse inlet passage through said inlet bore to permit hot water to enter said drum from said inlet bore; a longitudinal outlet bore extending inwardly from the other end of said shaft but spaced from said inlet bore; and transverse outlet passages through said outlet bore to permit hot water within said drum to enter said outlet bore.

18. Apparatus for forming individual items of deformable material, as defined in claim 17, wherein the number of inlet passages is greater than the number of outlet passages.

19. Apparatus for forming and packaging individual items of deformable material including an extruder for forming said deformable items; a pocket wheel mounted adjacent said extruder for carrying a lower strip of heat sealable material past said extruder for receiving said items; a plurality of laterally spaced and circumferentially spaced ribs on said wheel forming pockets thereon; and a depression wheel mounted adjacent said pocket wheel having circumferentially spaced feet corresponding in configuration to said pockets and adapted to enter said pockets to form a series of depressions in said lower strip for receiving said items.

20. Apparatus for forming and packing individual items of deformable material, as defined in claim 19, including a supply roll from which an upper strip of heat sealable material is dispensed; a tension roller engaging said upper strip; and a guide bar extending to a position adjacent the intersection of said extruder and said pocket wheel, said upper strip being directed around said guide bar and onto said items.

21. Apparatus for forming individual items of deformable material, comprising a housing having a cylindrical section disposed transversely at one end, an entrance section and a slot through which such material may be pushed from said entrance section into the interior of said cylindrical section, said cylindrical section having an exit slot spaced from said entrance slot; a cylindrical sleeve engaging the interior of said cylindrical housing section and provided with at least two circumferential rows of slots having a size corresponding to the size of the individual items to be formed; means for rotating said sleeve; and a member within said slotted sleeve and engaging said sleeve opposite at least said entrance slot and between said entrance slot and said exit slot, said member within said sleeve rotating with said sleeve and circumferentially engaging the inner periphery of said sleeve.

22. Apparatus for forming individual items of deformable material, as defined in claim 21, including a hollow fixed shaft, said slotted sleeve and said member within said sleeve rotating about said shaft; and heating means within said hollow shaft.

23. A method of packaging individual items of deformable material to which heat is applied, which comprises forming said items and applying heat to said items while forming the same; chilling a lower strip of heat sealable material; placing said items immediately after forming on said chilled lower strip of heat sealable material in both longitudinal and lateral rows; placing an upper strip over the items disposed on said lower strip; heat sealing said strips together around each of the individual items; severing said strips along longitudinal lines between the longitudinal rows of said items and within the heat sealed area; and severing said strips along lateral lines between said items and within the heat sealed area to form individual packages containing said items.

24. A method of packaging individual items of a deformable material, as defined in claim 23, which includes chilling said upper and lower strips both before and after heat sealing.

25. A method of packaging individual items of a deformable material, as defined in claim 23, which includes conveying said individual packages to a point of discharge and air chilling said packages during at least a portion of such conveying.

26. A method of forming individual items of a deformable material, which comprises pushing such material into a series of confined spaces, including spaces disposed in lateral and longitudinal spaced relation, in longitudinal succession; removing the items so formed from said spaces while contacting such items with a strip adapted to receive such items; supplying heat to at least a portion of each said item during at least removal from said spaces; chilling said strip prior to contact thereof with said items; and simultaneously moving said strip and the location of said spaces so that said items will be placed on said strip in both longitudinal and laterally spaced relation.

27. In apparatus for forming individual items of deformable material, such as butter, a housing having a transverse cylindrical section open at each end and an entrance section having a plurality of slots through which such material may be pushed into said cylindrical section, said cylindrical section having an exit slot spaced from said entrance slots; a cylindrical sleeve engaging the interior of said cylindrical housing section and provided with axially spaced, circumferential rows of slots having a size corresponding to the size of the individual items to be formed, said housing inlet slots being aligned with said rows of sleeve slots and one end of said sleeve being open and the opposite end of said sleeve being closed; means for rotating said sleeve connected to the closed end thereof; a fixed, hollow cylinder within said slotted sleeve and engaging the inner periphery of said sleeve, said fixed cylinder having a closed end provided with an axially extending boss journaled in the closed end of said sleeve and the opposite end of said fixed cylinder being open and having an outwardly extending flange attached to the end of said cylindrical housing section, said fixed cylinder having a slot corresponding in position to said exist slot of said cylindrical housing section; a fixed, hollow shaft tube disposed axially in said fixed cylinder and offset from the center thereof toward said exit slot; electrical heating means within said shaft tube; a series of pusher wheels mounted for free rotation about said shaft tube, said pusher wheels having a smaller diameter than said cylinder and corresponding in number to said rows of slots in said slotted sleeve and each being provided with a series of radially extending arms provided at their outer ends with blocks, each block being adapted to enter a sleeve slot at said exit slot, push a formed item from said sleeve slot and then leave said sleeve slot, the engagement of said blocks with said sleeve slots rotating said wheels with said slotted sleeve, each said block being provided with a radially extending rim around the lateral edges thereof, forming a well bounded by said rim, and a pair of spaced radial slots extending into said well and open at the end thereof opposite said well; and means, including a curved, hollow plate through which a cooling medium may be circulated, for guiding and moving a strip along said exit slot to engage and receive said formed items, said exit slot having a width such that said exit slot forms a lateral guide for said strip.

28. In apparatus for forming individual items of deformable material, such as butter, a housing having a cylindrical section disposed transversely at one end and an entrance section having converging walls leading to a throat through which such material may be pushed into said cylindrical section, said cylindrical section having open ends and an exit slot spaced from said throat; a cylindrical sleeve open at each end and engaging the interior of said cylindrical housing section and provided with a series of circumferential rows of slots having a size corresponding to the size of the individual items to be formed; a cylindrical shaft within said slotted sleeve and engaging the inner periphery thereof; a hollow tube within said cylindrical shaft; electrical heating means within said tube; a cap closing each end of said cylindrical housing section and provided with bearing means for said cylindrical shaft; means for rotating said cylindrical shaft; and means for moving a strip past said exit slot for engaging and receiving the formed items, said exit slot having a width such as to form a lateral guide for said strip.

29. In apparatus for packing individual items of deformable material, means for forming such individual items; means for discharging said items from said forming means and placing said items between two strips of heat sealable material in longitudinal and lateral rows; means for heat sealing said strips together around each said item; means for severing said strips along longitudinal lines between the longitudinal rows of said items; means for severing said strips laterally between lateral rows of said items to form individual packages containing said items; conveying means inclined downwardly for receiving individual packages in succession and depositing said packages in a carton having an open top; a support for a stack of said cartons for maintaining said cartons at an inclination corresponding to said conveying means, said support being provided with a stop which prevents downward movement of said stack of each of said cartons below the uppermost, so that the uppermost carton will slide off the stack when filled with a predetermined number of said packages; and resilient means for urging said stack upwardly so that the next carton to be filled will be disposed beneath the discharge end of said conveying means and thereby receive said packages when the previous carton has slid off said stack.

References Cited by the Examiner

UNITED STATES PATENTS

| | | | |
|---|---|---|---|
| 1,312,874 | 8/19 | Roberts | 83—343 |
| 2,134,862 | 11/38 | Durman | 53—180 X |
| 2,156,466 | 5/39 | Vogt | 53—27 |
| 2,203,079 | 6/40 | Chandler | 53—387 |
| 2,666,229 | 1/54 | Vogt | 53—122 X |
| 2,702,971 | 3/55 | Brandenberger | 53—122 |
| 2,770,936 | 11/56 | Clark | 53—180 |
| 2,785,749 | 3/57 | Wilson et al. | 83—430 |
| 2,829,695 | 4/58 | Jarvis | 83—346 |
| 2,928,221 | 3/60 | Smith | 53—182 |
| 2,958,173 | 11/60 | Mead | 53—178 |

FRANK E. BAILEY, *Primary Examiner.*

BROMLEY SEELEY, *Examiner.*